(12) United States Patent
Hooks et al.

(10) Patent No.: US 11,612,813 B2
(45) Date of Patent: Mar. 28, 2023

(54) AUTOMATIC MULTIMEDIA PRODUCTION FOR PERFORMANCE OF AN ONLINE ACTIVITY

(71) Applicant: Dolby Laboratories Licensing Corporation, San Francisco, CA (US)

(72) Inventors: Stephen Spencer Hooks, San Mateo, CA (US); Aaron Joseph Krasnov, Oakland, CA (US); Eric Whelan Yeargan, Dallas, TX (US); Stewart Murrie, San Francisco, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 28 days.

(21) Appl. No.: 17/038,248

(22) Filed: Sep. 30, 2020

(65) Prior Publication Data

US 2021/0093967 A1 Apr. 1, 2021

Related U.S. Application Data

(60) Provisional application No. 62/908,481, filed on Sep. 30, 2019.

(51) Int. Cl.
*A63F 13/40* (2014.01)
*G10L 25/63* (2013.01)
(Continued)

(52) U.S. Cl.
CPC ............ *A63F 13/40* (2014.09); *A63F 13/213* (2014.09); *G06V 40/174* (2022.01); *G10L 25/57* (2013.01); *G10L 25/63* (2013.01)

(58) Field of Classification Search
CPC ...... A63F 13/213; A63F 13/40; A63F 13/655; A63F 13/79; A63F 13/87
See application file for complete search history.

(56) References Cited

U.S. PATENT DOCUMENTS 8,621,503 B2 12/2013 Marin
8,661,496 B2 2/2014 Perlman
(Continued)

FOREIGN PATENT DOCUMENTS

CN 105338372 B 4/2019

OTHER PUBLICATIONS

"Don't Just Watch, Join in" TWITCH, Internet, Feb. 2018, https://www.twitch.tv/p/about/.
(Continued)

*Primary Examiner* — Seng H Lim

(57) ABSTRACT

A system is configured to receive player multimedia having live coverage of physical expressions or actions of a player in an online activity and activity multimedia of live participation in the online activity associated with one or more play accounts. In a near continuous fashion, the system is configured to select in real time, for each time point, one or more player items being portions of the player multimedia or one or more activity items being portions of the activity multimedia corresponding to the time point to form a composite item. The system is configured to further transmit in real time the composite item to one or more viewer accounts. The system is configured to then receive viewer data in response and produce future composite items based on the viewer data.

20 Claims, 9 Drawing Sheets

(51) Int. Cl.
*A63F 13/213* (2014.01)
*G10L 25/57* (2013.01)
*G06V 40/16* (2022.01)

(56) References Cited

U.S. PATENT DOCUMENTS

| | | | |
|---|---|---|---|
| 8,840,475 | B2 | 9/2014 | Perlman |
| 9,272,209 | B2 | 3/2016 | Perlman |
| 9,288,537 | B2 | 3/2016 | Morris |
| 9,349,201 | B1* | 5/2016 | Gault ...................... A63F 13/25 |
| 9,467,486 | B2 | 10/2016 | Gurbag |
| 9,707,481 | B2 | 7/2017 | Perlman |
| 9,782,678 | B2 | 10/2017 | Long |
| 10,335,690 | B2* | 7/2019 | Schleicher ........... G11B 27/031 |
| 10,639,548 | B1* | 5/2020 | Bansi ...................... A63F 13/79 |
| 10,863,230 | B1* | 12/2020 | Pham ................. H04N 21/6547 |
| 11,090,568 | B1* | 8/2021 | Mattar .................. A63F 13/211 |
| 2006/0251383 | A1 | 11/2006 | Vronay |
| 2009/0115617 | A1* | 5/2009 | Sano .................... G09B 29/007 340/286.01 |
| 2013/0300832 | A1 | 11/2013 | Hohteri |
| 2016/0287997 | A1* | 10/2016 | Laakkonen ............. A63F 13/00 |
| 2016/0337718 | A1 | 11/2016 | Talbott |
| 2017/0157512 | A1* | 6/2017 | Long ..................... A63F 13/497 |
| 2017/0228600 | A1* | 8/2017 | Syed ...................... G06V 20/62 |
| 2017/0289617 | A1* | 10/2017 | Song .................. H04N 21/8456 |
| 2018/0078862 | A1* | 3/2018 | Schleicher ......... H04N 21/4781 |
| 2019/0118098 | A1* | 4/2019 | Payzer .................... A63F 13/86 |
| 2019/0118099 | A1* | 4/2019 | Payzer ................ H04L 67/2823 |
| 2020/0186897 | A1* | 6/2020 | Dareddy ............... A63F 13/497 |
| 2022/0032202 | A1* | 2/2022 | Mattar .................. A63F 13/212 |

OTHER PUBLICATIONS

Alamares, Mark "AI Will soon Bring Huge Changes to Live Video Production" Oct. 2017, PROQUEST.

Riedl, Mark Owen, et al. "AI for Game Production" Internet, Technical Literature Search, Jun. 2013.

* cited by examiner

(12) United States Patent

AUTOMATIC MULTIMEDIA PRODUCTION FOR PERFORMANCE OF AN ONLINE ACTIVITY

CROSS-REFERENCE TO RELATED APPLICATION(S)

This application claims the benefit of priority to U.S. Provisional Patent Application No. 62/908,481, filed Sep. 30, 2020, which is hereby incorporated by reference in its entirety.

TECHNICAL FIELD

The present Application relates to media. More specifically, example embodiments described below relate to processing audio and video media content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

People perform many online activities these days. An example of an online activity is a computer game, which can depict real-world activities or made-up activities. Typically, a participant in an online activity ("player"), especially an interactive or competitive online activity, has a digital representation in the online activity even when the online activity is presented from a first-person perspective, and a multimedia presentation of the performance of the online activity that may include an animation of the digital representation can be made available for consumption ("viewing"). There is an increasing interest in also viewing actual, physical expressions or actions of the player when the player is participating in the online activity; such physical expressions or actions may be somewhat distinct given the usually limited physical freedom or deep mental involvement in the often-complex online activity.

While it may be commonplace these days to provide a live stream, which can show the physical expressions or actions of a player, a player can be too absorbed in the online activity to manage the contents of the stream. Furthermore, not only does the player serve as a source of content for viewing, the player's participation in the online activity also serves a source of content for viewing. It can be a challenge to compose multimedia from these sources in real time that is most desirable for viewing.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENTS

Figure 1:
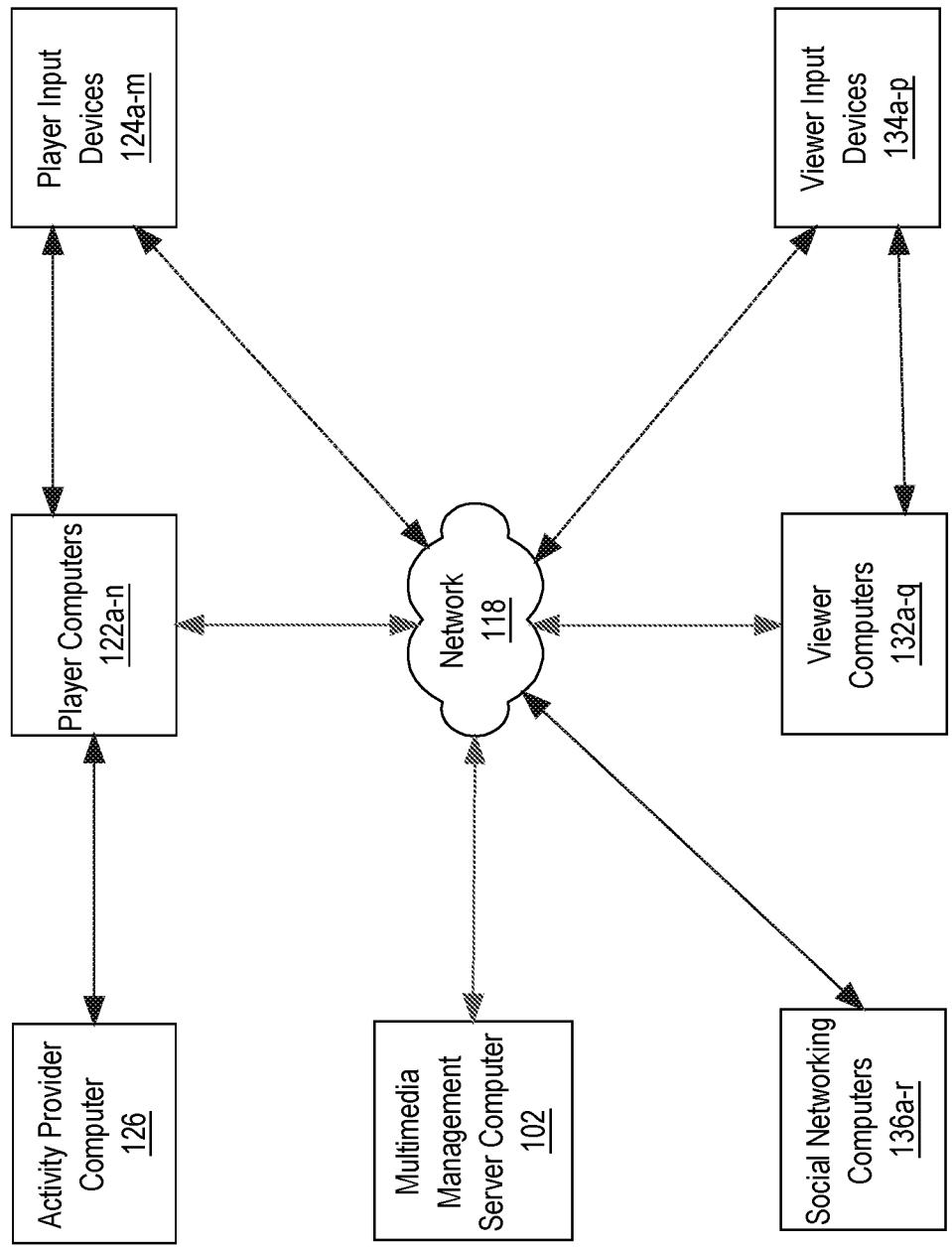
FIG. 1 illustrates an example networked computer system in which various embodiments may be practiced.

In the following description, for the purposes of explanation, numerous specific details are set forth in order to provide a thorough understanding of the example embodiments the present invention. It will be apparent, however, that the example embodiments may be practiced without these specific details. In other instances, well-known structures and devices are shown in block diagram form in order to avoid unnecessarily obscuring the example embodiments.

Embodiments are described in sections below according to the following outline:
1. General Overview
2. Example Computing Environments
3. Example Computer Components
4. Functional Descriptions
   4.1. Management of Activity Data and Player Data
   4.2. Management of Viewer Data
   4.3. Enhancement Related to Activity Data or Player Data
   4.4. Production of Multimedia of Physical Expressions or Actions of Players or Participation of Players in Online Activities
5. Example Processes
6. Hardware Implementation
7. Extensions and Alternatives

1. General Overview

A system for automatic multimedia production and related methods are disclosed. In some embodiments, A system is configured to receive player multimedia having live coverage of physical expressions or actions of a player in an online activity and activity multimedia of live participation in the online activity associated with one or more play accounts. In a near continuous fashion, the system is configured to select in real time, for each time point, one or more player items being portions of the player multimedia or one or more activity items being portions of the activity multimedia corresponding to the time point to form a composite item. The system is configured to further transmit in real time the composite item to one or more viewer accounts. The system is configured to then receive viewer data in response and produce future composite items based on the viewer data.

In some embodiments, a system is programmed to receive player data associated with a player account of a player participating in an online activity from a player's computer. For example, an online activity can be a computer game managed by a game server. The player data can include player multimedia capturing the player's physical expressions or actions in participating in the online activity. For example, the player's facial expressions and voices in playing the computer game can be captured by a camera and a microphone and the captured data can be sent to the system as soon as the data is generated. The player data can also include player metadata containing the player's preferences related to the player or player's participation in the online activity. For example, player metadata can indicate how the player multimedia is to be incorporated into composite multimedia to be sent to viewer accounts or how certain effects are to be applied to the player multimedia. The system is programmed to define a set of player states for a portion of the player data ("player item") corresponding to a time point. The player states can correspond to specific types of emotions, sentiments, or apparent mental states of a player, for instance. The system can be programmed to construct a digital model for identifying a player state for a new player item.

In some embodiments, the system is programmed to also receive activity data associated with the player account. The activity data can include activity multimedia representing the player's participation in the online activity. For example, the activity multimedia can depict the player's digital representation taking actions in a virtual environment of the computer game and the depicted data can be sent to the system as soon as the data is received or generated. The activity multimedia can be the original game multimedia provided by the game server, which may need to be converted into audio or video data, or captured from a presentation of the game multimedia by output devices coupled with the player's computer. The activity data can also include activity metadata indicating attributes of the online activity or current values of those attributes. For example, the attributes could be characters, objects, locations, stages, rewards, rules, or other variables of the computer game. The system is programmed to define a set of activity states for a portion of the activity data ("activity item") corresponding to a time point. The activity states can correspond to stages, events, or actions of the player's digital representation in the online activity, for instance. The system can be programmed to construct a digital model for identifying an activity state for a new activity item.

In some embodiments, for each time point during a time period, the system is programmed to identify a player state for a player item and an activity state for an activity item corresponding to the time point associated with the player account. For example, an activity state can be identified for what is presented by the output devices coupled to the player's computer regarding the player's participation in the computer game during the last second, and a player state can be identified for the player's facial expressions during the last second. The system is programmed to then select a segment of the player item or a segment of the activity item to form a composite item. The selection can include determining an arrangement of the player item and the activity item in a foreground of the composite item based on the activity state of the activity item, the player state of the player item, a combination thereof, or other activity data or player data. For example, when the activity state corresponds to a scene of an ongoing computer game, the arrangement can include a visual layout that assigns a relatively large region to the activity item and a relatively small region to the player item, while when the activity state corresponds to a stage of the computer game that merely presents menu options, the arrangement can include a visual layout that assigns a relatively small region to the activity item and a relatively large region to the player item.

In some embodiments, the system can be programmed to identify certain multimedia effects to also incorporate into the composite item based on the activity state of the activity item, the player state of the player item, a combination thereof, or other activity data or player data. For example, when the activity state corresponds to a night scene of the computer game, the multimedia effect can be darkening the player item, while when the player state and the activity state indicate that the player looks angry when the player's character in the computer game just won some prizes, the multimedia effect can be playing some shocking music over the existing sounds. The system is programmed to transmit in real time the composite item to a viewer account.

In other embodiments, multiple players may be simultaneously participating in the online activity, and the player multimedia and the activity can be associated with multiple player accounts. The collection and processing of a player item and an activity item associated with one player account can be extended to that of multiple player items and activity items associated with multiple player accounts.

The system is programmed to further receive viewer feedback from the viewer account related to the composite item. The viewer data can include viewer multimedia capturing the viewer's physical expressions or actions in viewing performance of the online activity. For example, the viewer's facial expressions, voices, or written text related to a player's gestures or the actions of the player's digital representation in the computer game can be captured by a camera, a microphone, and a keyboard, and the captured data can be sent to the system as soon as the data is generated. The viewer data can also include viewer metadata containing the viewer's preferences related to the player or player's participation in the online activity. The system can be programmed to also define a set of viewer states for a portion of the viewer data ("viewer item") corresponding to a time point. The viewer states can correspond to specific types of emotions, sentiments, or apparent mental states of a viewer or directed to a portion of the player multimedia or activity multimedia associated with a player account, for instance. The system can be programmed to construct a digital model for identifying a viewer state for a new viewer item.

In some embodiments, the system can be programmed to communicate the viewer data related to a player account, which can be aggregated over multiple viewer accounts, to the player account. The system can also be programmed to form future composite items based on the viewer data. For example, a player item associated with a player's reaction towards the result of an action of the player's digital representation in the online activity that is popular with the viewer accounts can be assigned a more prominent region in the composite item, or a player item can be enhanced with visual effects of images of question marks in the composite item when an action of the player's digital representation receives an expected reaction from the viewer accounts.

The server offers certain technical benefits. The system enables automatic production of streaming multimedia. The multimedia is produced in real time from live contents. The multimedia has high-quality contents as being composed from data from multiple sources (including different input devices, activity provider computers, player computers, viewer computers, or other external sources) and including multiple views related to performance of an online activity (including one view of a player's participation in the online activity and one view of the player). Furthermore, the multimedia allows for better viewing experience as being composed using machine learning techniques that is expected to require less-than-average manual adjustments from viewer accounts of how the multimedia is presented (including a visual or auditory arrangement of a player item and an activity item) without introducing excessive processing delays.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a multimedia management server computer 102 ("server"), one or more player computers 122a-n, and one or more viewer computers 132a-q, which are communicatively coupled via one or more networks 118. The one or more player computers 122a-n are communicatively coupled to an activity provider computer 126. The networked computer system can also comprise player input devices 124a-m or viewer input devices 134a-p communicatively coupled to the other computers via the one or more networks 118. Alternatively, the player input devices 124a-m can be coupled to the player computers 122a-n, or the viewer input devices 134a-q can be coupled to the one or more viewer computers 132a-p. In other embodiments, the activity provider computer 126 can also be communicatively coupled the other computers via the one or more networks 118, or additional activity provider computers can be included in the networked computer system.

In some embodiments, the server 102 broadly represents one or more computers, virtual computing instances, and/or instances of an application that is programmed or configured with data structures and/or database records that are arranged to host or execute functions related to automatic, real-time production and distribution of multimedia from activity data related to participation in an online activity managed by the activity provider computer 126 of players associated with the player computers 122a-n, player data related to physical expressions or actions of players associated with the player computers 122a-n who are participating in the online activity, or viewer data related to feedback of viewers associated with the viewer computers 132a-q who are viewing the performance of the online activity through the multimedia produced by the server 102. The server 102 can comprise a server farm, a cloud computing platform, a parallel computer, or any other computing facility with sufficient computing power in data processing, data storage, and network communication for the above-described functions.

In some embodiments, each of the player computers 122a-n is programmed to receive data related to the participation in an online activity from the activity provider computer 126, cause a multimedia presentation of the online activity, receive instructions on how to participate in the online activity, or transmit the instructions to further the participation in the online activity to the activity provider computer 126. The player computer is also programmed to transmit the data related to the participation of an associated player in the online activity to the server 102. The player computer is additionally programmed to receive sensor data related to the physical expressions or actions of the associated player in participating in the online activity from the player input devices 124a-m and transmit such sensor data to the server 102. Furthermore, the player computer is configured to receive viewer feedback on the player's physical expressions or actions or the player's participation in the online activity from the server 102, or cause a presentation of the viewer feedback. The player computer may have a similar hardware composition as the server 102 or may comprise a typical client device, such as a desktop computer, laptop computer, tablet computer, smartphone, wearable device, or any other type of computing device with sufficient computing power in data processing, data storage, and network communication for the above-described functions.

In some embodiments, each of the viewer computers 132a-q is programmed to receive composite multimedia from the server 102 and transmit data related to the viewing of an associated viewer of the performance of the online activity to the server 102. The viewer computer may have a similar hardware composition as the server 102 or may comprise a typical client device, such as a desktop computer, laptop computer, tablet computer, smartphone, wearable device, or any other type of computing device with sufficient computing power in data processing, data storage, and network communication for the above-described functions.

In some embodiments, the activity provider computer 126 is programmed to manage the performance of the online activity, including producing and transmitting the multimedia of the participation in the online activity to a player computer or receiving instructions from a player computer on how to participate in the online activity. The activity provider computer 126 may have a similar hardware composition as the server 102 or may comprise any other type of computing device with sufficient computing power in data processing, data storage, and network communication for the above-described functions.

In some embodiments, each of the social networking computers 136a-r is programmed to management a social network, including transmitting and receiving digital communications among members of the social network who are viewers associated with the one or more viewer computers 132a-q. The social networking computer may have a similar hardware composition as the server 102 or may comprise any other type of computing device with sufficient computing power in data processing, data storage, and network communication for the above-described functions.

In some embodiments, each of the player input devices 124a-m or viewer input devices 134a-p can include a microphone, a camera, a microphone, a keyboard, a mouse, a touchpad, a thermometer, a heart rate monitor, an eye tracker, or another sensor to capture what is happening on a screen of a player computer, with a player, or with a viewer. The input device may be physically connected to a player computer, a viewer computer, a player, a viewer, or a computer network. The input device is configured to transmit the sensor data to a player computer, a viewer computer, or the server 102. The input device may include a processor or may be integrated into another typical client device, such as a desktop computer, laptop computer, tablet computer, smartphone, or wearable device.

The networks 118 may be implemented by any medium or mechanism that provides for the exchange of data between the various elements of FIG. 1. Examples of the networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, during the performance of the online activity, from each of the player computers 122*a-n*, the server 102 is programmed to receive activity data. The activity data can include metadata of the online activity and activity multimedia that digitally depicts the corresponding player's participation in the online activity through the player's digital representation. In a near continuous fashion, for each of a plurality of time points during the performance of the online activity, the server 102 is programmed to receive activity data that is produced at or near the time point. The server 102 is programmed to also receive player data. The player data can include preferences of the corresponding player or player multimedia that captures the player's physical expressions or actions in participating in the online activity. For each of a plurality of time points during the performance of the online activity, the server 102 is programmed to also receive player data that has live coverage at or near the time point. Some of the player multimedia can also be received from the player input devices 124*a-m*. From each of the viewer computers 132*a-q*, the server 102 is programmed to receive viewer data. The viewer data can include preferences of the corresponding viewer or viewer multimedia that captures the viewer's physical expressions or actions in viewing the performance of the online activity. Some of the viewer multimedia can also be received from the viewer input devices 134*a-p* or the social networking computers 136*a-r*. For each of the plurality of time points, for each of the viewer computers 132*a-q*, the server 102 is programmed to compose in real time a composite item, based on the viewer data received from the viewer computer, from an activity item as a portion of the activity data and a player item as a portion of the player data corresponding to the time point received from each of the player computers 122*a-n*, and transmit in real time the composite item to the viewer computer.

3. Example Computer Components

Figure 2:
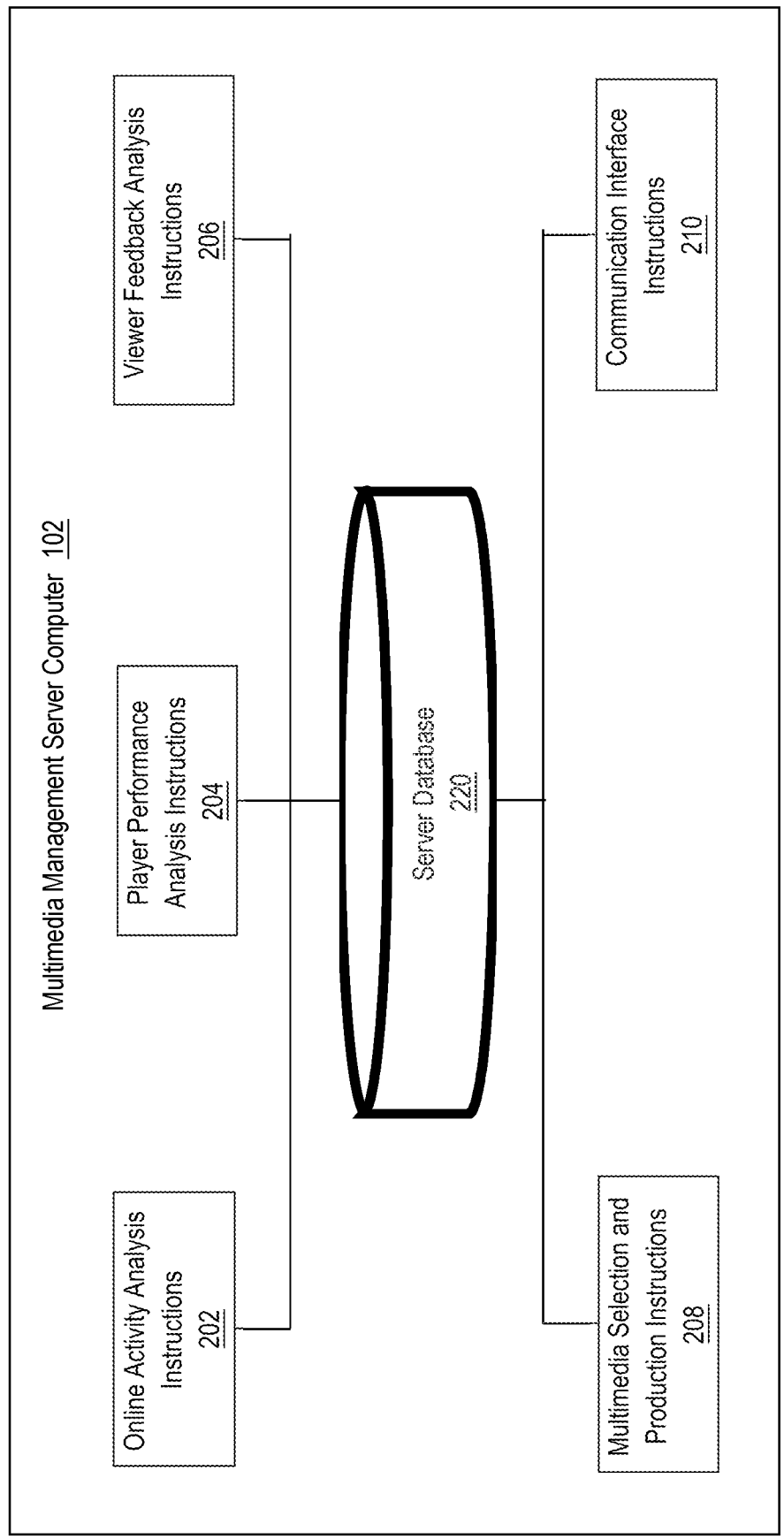
FIG. 2 illustrates example components of a multimedia management server computer in accordance with the disclosed embodiments.

FIG. 2 illustrates example components of a multimedia management server computer in accordance with the disclosed embodiments. The figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise online activity analysis instructions 202, player performance analysis instructions 204, viewer feedback analysis instructions 206, multimedia selection and production instructions 208, and communication interface instructions 210. In addition, the server 102 can comprise a server database 220.

In some embodiments, the online activity analysis instructions 202 enable the processing of activity data including activity multimedia related to participation in an online activity associated with one or more player accounts. The processing can include defining activity states, building a digital model for classifying an activity item comprising video or audio data corresponding to a time point or a relatively small period into one of the activity states, and identifying an activity state for a new activity item by executing the digital model. The processing can further include creating multimedia effects from the activity data.

In some embodiments, the player performance analysis instructions 204 enable the processing of player data including player multimedia related to physical expressions or actions in participating in an online activity associated with one or more player accounts. The processing can include defining player states, building a digital model for classifying a player item comprising video or audio data corresponding to a time point or a relatively small period into one of the player states, and identifying a player state for a new player item by executing the digital model. The processing can further include creating multimedia effects based on the player data.

In some embodiments, the viewer feedback analysis instructions 206 enable the processing of viewer data including viewer multimedia related to physical expressions or actions in viewing the performance of an online activity associated with one or more viewer accounts. The processing can include defining viewer states, building a digital model for classifying a viewer item comprising video or audio data corresponding to a time point or a relatively small period into one of the viewer states, creating an aggregate viewer item from one or more new viewer items associated with the one or more viewer accounts, and identifying a viewer state for the aggregate viewer item by executing the digital model. The processing can further include creating multimedia effects based from the viewer data.

In some embodiments, the multimedia selection and production instructions 208 enable the selection and production of composite multimedia from the activity data and the player data. The selection and production can include creating a digital model for determining an arrangement of one or more portions of activity items from the activity data or player items from the player data for a given time point. The selection and production can further include, for a given time point, determining an arrangement of corresponding activity items from the activity multimedia and player items from the player multimedia associated with one or more player accounts by executing the digital model, selecting a segment of an activity item or a segment of a player item for the arrangement, thereby composing a composite item with the selected portions as part of composite multimedia over time, and applying multimedia effects based on the activity item, the player item, or the viewer data to the composite items.

In some embodiments, the communication interface instructions 210 enable the communication with various computers in the networked computing system or environment. The communication can include receiving activity data or player data from a play computer or a player input device, receiving viewer data from a viewer computer, a viewer input device, or a social networking computer, transmitting viewer feedback to a player computer, or transmitting composite multimedia to a viewer computer.

In some embodiments, the server database 220 is programmed or configured to manage storage of and access to relevant data, such as data related to player accounts or viewer accounts, definitions of activity states, player states, or viewer states, activity data including activity multimedia, player data including player multimedia, viewer data including viewer multimedia, digital models for identifying an activity state, a player state, or a viewer state, digital models for producing composite multimedia, training data for the digital models, digital model execution results, or composite multimedia.

4. Functional Descriptions

4.1. Management of Activity Data and Player Data

In some embodiments, the server 102 is programmed to receive activity data related to participation in an online activity in various formats and from various sources, as further discussed below. The server 102 is programmed to initially define activity states into which the activity data or specifically an activity item as a part of the activity data corresponding to a certain time point is to be classified. An online activity generally requires a digital account of an activity participant or a player ("player account") to interact with an activity server to contribute to a multimedia presentation of a virtual environment in which each player account may have a digital representation. Examples of an online activity include a computer game or a virtual musical band. One set of activity states can be defined for each type of online activity, such as a computer game, or for each specific online activity, such as the Fortnite® computer game. An activity state may correspond to a stage of an online activity or an event in the online activity. Different stages of an online activity can include a menu stage where a player through a player account is allowed to decide how to proceed within the online activity, a gameplay stage where a player through a player account is actively participating in the online activity, or a map stage where a player through a player account is allowed to have an overview of the virtual environment. Different events of an online activity can include the beginning or end of the online activity, the achievement of objectives of the online activity, the change of stages within the online activity, the arrival or departure of a player, the change of status of a player, the performance of specific actions by a player, or the interaction between multiple players. Different events of an online activity can also include granular items focused on the evolution or development of a certain aspect of the virtual environment, such as a specific location or object, or a certain aspect of the multimedia presentation, such as a specific type of sound or coloring.

In some embodiments, the server 102 is programmed to receive activity data regarding participation in an online activity in various formats and from various sources. A static portion of the activity data related to the online activity in general can be received in advance or any time, while a dynamic portion of the activity data related to participation in an ongoing online activity can be produced and transmitted in real time. Some of the activity data could be used for purposes of training a digital model, as further discussed below. Some of the activity data could be classified using the digital model or otherwise processed to create the composite multimedia to be streamed to viewer computers, as further discussed below.

In some embodiments, the activity data can include activity metadata or activity multimedia originally communicated by an activity provider computer, which develops the online activity and organizes the performance thereof and provides an evolving virtual environment for the performance of the online activity. Such activity data can be converted to video or audio data before being incorporated into composite multimedia. When such activity is converted and presented by output devices coupled to the player's computer, additional activity multimedia can be captured from the output of these output devices using input devices, such as a camera or a microphone. The activity metadata can include many types of data that are typically accessible from an application programming interface (API) offered by the activity provider computer or are transmitted together with the multimedia presentation of the virtual environment, such as static data related to predetermined characters, moods, settings, stages, or other variables of the game, or dynamic data related to current values of the predetermined variables. The activity multimedia can also include many types of data, such as video data in one or more views or audio data in one or more tracks, that depict the virtual environment and the online activity being performed therein.

In some embodiments, the server 102 is programmed to build a training set for a digital model for classifying an activity item as a portion of given activity data that is produced at or near a point during the performance of an online activity, into one of the activity states. A "digital model" in this context refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. The training set can include a certain number of activity items, each activity item comprising image vectors or sound vectors from a portion of the activity multimedia within the given activity data corresponding to a relatively small time period. An activity item can further comprise encodings of a portion of the activity metadata, even the static portion that does not often vary over time. The text or other types of data in the activity metadata can be classified or encoded using existing analysis techniques specific to the data types before being included in the training set. Each activity item can also be associated with a label of one of the activity states. The server 102 can be programmed to construct the digital model from the training set of activity items and associated labels using any supervised learning technique known to someone skilled in the art. An example of a digital model built based on a supervised learning technique is a convolutional neural network (CNN), which can be implemented using any of existing software packages corresponding to somewhat different architectures, such as InceptionNetV3. In certain embodiments, the server 102 is programmed to enhance the architecture provided by InceptionNetV3 by enlarging the input shape, increasing the number of neurons in the fully-connected layer, and applying dropout. The server 102 can be programmed to further enhance the architecture by adding a first fully-connected layer with an RELU activation function and a lower dropout rate, such as 0.2, and a second output layer with a softmax activation function and a higher dropout rate, such as 0.5. The server 102 can also be programmed to construct the digital model from the training set of activity items using any unsupervised learning technique known to someone skilled in the art, such as k-means clustering.

In some embodiments, the server 102 is programmed to receive player data related to physical expressions or actions of a player participating in an online activity in various formats and from various sources, as further discussed below. The server 102 is programmed to initially define player states into which the player data or specifically a player item as a part of the player data corresponding to a certain time point is to be classified. Different player states typically correspond to different types of physical expressions or actions shown or performed by a player in participating in an online activity. The server 102 can be programmed to identify universal or specific types of physical expressions or actions that signal various types of emotions or apparent mental conditions. For example, happiness can be signaled by a smile that is universally understood or a whistle tone that is unique to a certain player. The mental states may be described relative to the participation in the online activity. For example, an engrossed state may be signaled by non-blinking eyes or deep frowning, while a careless state may be signaled by excessive chatting with another player or even disappearance or absence from the view. Different types of physical expressions or actions can also include granular items focused on a portion of the player or a reaction to a certain event of the online activity, such as the breathing of the player or the reaction to being defeated by another player.

In some embodiments, the server 102 is programmed to receive player data regarding physical expressions or actions of a player participating in an online activity in various formats and from various sources. A static portion of the player data related to the player in general can be received in advance or any time, while a dynamic portion of the player data related to the player who is participating in an ongoing online activity can have live coverage. Some of the player data could be used for purposes of training a digital model, as further discussed below. Some of the player data could be classified using the digital model or otherwise processed to create the composite multimedia to be streamed to viewer computers, as further discussed below.

In some embodiments, the player data can include player metadata or player multimedia communicated by the player computer of the player coupled with input devices, such as a camera or a microphone, a thermometer, a heart rate monitor, or another sensor that are placed near or on the player or directly from the input devices. The player multimedia can also be communicated directly by the input devices. The player metadata can include a generally static player profile of descriptions or preferences of the player. The player preferences can cover many areas. One area is player presentation, such as whether to use an existing avatar in place of the player's facial image, how to distort or transform the player's facial expressions or voices to create an avatar, or when to use an avatar. One area is composite multimedia generation, which can be related to the use of input devices to generate the player multimedia, the visual or auditory theme or effects to use for the player multimedia, the positioning of the player multimedia relative to the activity multimedia in the composite multimedia, expressions, gestures, or speech captured in the player multimedia to be manifested or avoided, or objects, actions, or scenes depicted in the activity multimedia to be manifested on or deemphasized. Another area is viewer feedback, such as whether or how often to receive viewer feedback on the player's participation in the online activity, what types of viewer feedback to receive, or whether information regarding viewer feedback is to be shared with the viewers through the composite multimedia.

In some embodiments, the server 102 can be programmed to determine the initial types, number, and locations of the input devices used to generate the player multimedia at various time points. For example, for each player, a camera configured to capture the head of the player or a camera configured to capture the upper body of the player may be required by the server 102 or preferred by the player, and a microphone configured to capture the player's voices in a regular volume or a microphone configured to capture the background sounds of the room where the player is located, which may come from electronic devices, pets, or other people, may be required by the server 102 or preferred by the player. The server 102 can be programmed to transmit such data related to input devices to a player computer before receiving player multimedia from the player computer or upon a redetermination of such data.

In some embodiments, the server 102 is programmed to polish raw player multimedia, as the physical expressions or actions of a player can be relatively imprecise and the data produced by input devices coupled to a player device can be of indeterminate quality. The server 102 can be programmed to sharpen the focus, remove any noise, or otherwise improve the raw player multimedia before determining a corresponding player state, generating additional effects, or incorporating a portion into the composite multimedia.

In some embodiments, the server 102 is programmed to receive player data associated with multiple player accounts that simultaneously participate in an online activity. The server 102 can be programmed to track the players' participation in the online activity. In addition, the server 102 can be programmed to identify any player relationship from any player multimedia associated with participation in the online activity. Such a player relationship can arise when a player refers to or addresses another player who is also participating in the online activity. As the players may not be positioned in the same location, the identification can be based on an utterance of a known identifier of another player or of that player's digital representation in the online activity or a look or a gesture towards another player's digital representation in the online activity. The server 102 can be programmed to store information related to the identified player relationships for future use.

In some embodiments, the server 102 is programmed to build a training set for a digital model for classifying a player item as a portion of given player data that has live coverage at or near to a point during the performance of an online activity, into player states. The training set can include a certain number of player items, each player item comprising image vectors or sound vectors from a portion of the player multimedia of the given player data. A player item can also comprise encodings of a portion of the player metadata, even the static portion that does not often vary over time. The text or other types of data in the player metadata can be classified or encoded using existing analysis techniques specific to the data types before being included in the training set. Each player item can also be associated with a label of one of the player states. As discussed above, the server 102 can be programmed to construct the digital model from the training set of player items and associated labels using any supervised learning technique known to someone skilled in the art. An example of a digital model built based on a supervised learning technique is a CNN, which can be implemented using any of existing software packages corresponding to somewhat different architectures, such as InceptionNetV3. The server 102 can also be programmed to construct the digital model from the training set of player items using any unsupervised learning technique known to someone skilled in the art, such as k-means clustering.

4.2. Management of Viewer Data

In some embodiments, the server 102 is programmed to stream composite multimedia created form the activity multimedia and player multimedia to viewer computers, as further discussed below. The server 102 is programmed to further receive viewer data related to physical expressions or actions of a viewer viewing performance of an online activity in various formats and from various sources, as further discussed below. The server 102 is programmed to initially define viewer states into which the viewer data or specifically a viewer item as a part of the viewer data corresponding to a certain time point is to be classified. In general, the viewer states may be related to the activity multimedia incorporated into the composite multimedia, the player multimedia incorporated into the composite multimedia, or the overall composite multimedia at various levels, as further discussed below. Regarding the activity multimedia associated with a player account, the viewer state may be related to viewer feedback directed to how the corresponding player participates in the online activity, or anything else that occurs in the virtual environment for the performance of the online activity. Regarding the player multimedia associated with the player account, the viewer state maybe be related viewer feedback directed to how the player reacts to the occurrence of an event of the online activity, how the player communicates with another player participating in the online activity, or any other aspect of the player's physical expressions or actions, which may or may not be tied to specific portions of the activity multimedia. Regarding the overall composite multimedia, the viewer state may be related to viewer feedback directed to an arrangement of the activity multimedia player multimedia, any effects created based on the activity multimedia, or any effects created based on the player multimedia. The viewer state can be further associated with one of multiple sentiment types, which can correspond to discrete labels, such as positively received, acknowledged, favored, praised, disliked, disapproved, or disgusted, or simply numerical ranges.

In some embodiments, the server 102 is programmed to stream the composite multimedia that can include requests for viewer feedback, as further discussed below. Therefore, the viewer feedback can be submitted voluntarily or in response to such requests. In the latter case, the type of the viewer feedback is typically known in advance.

In some embodiments, the server 102 is programmed to receive viewer data related to physical expressions or actions of a viewer viewing performance of an online activity in various formats and from various sources. A static portion of the viewer data related to the viewer in general can be received in advance or any time, while a dynamic portion of the viewer data related to physical expressions or actions of the viewer who is viewing the performance of an ongoing online activity can have live coverage. Some of the viewer data could be used for purposes of training a digital model, as further discussed below. Some of the viewer data could be classified using the digital model or otherwise processed to be incorporated in the composite multimedia to be subsequently streamed to viewer computers, as further discussed below.

In some embodiments, the viewer data can include viewer metadata or viewer multimedia communicated by the viewer computer of the viewer coupled with input devices, such as a camera, a microphone, a keyboard, a thermometer, a heart rate monitor, or another sensor that are placed near or on the viewer. The viewer multimedia can also be communicated directly by the input devices or received from external systems, such as social networking websites. The viewer multimedia can be used to determine the current viewer state and ultimately direct the production of the composite multimedia. The viewer metadata can include a generally static viewer profile of descriptions or preferences of the viewer. The viewer preferences can cover many areas. One area is composite multimedia generation, which can be related to a selection of which player's player multimedia to feature or avoid or which players' player multimedia to combine in the composite multimedia, the positioning of the player multimedia relative to the activity multimedia, expressions, gestures, or speech to be manifested on or avoided in the player multimedia, or objects, actions, or scenes to be manifested on or deemphasized in the activity multimedia. Another area is viewer feedback, which can be related to whether to aggregate or show other viewer's viewer feedback in the composite multimedia or which types of viewer feedback of the viewer to submit to the server 102.

In some embodiments, the server 102 can be programmed to determine the initial types, number, and locations of the input devices used to generate the viewer multimedia at various time points. For example, for each viewer, a camera configured to capture the head of the viewer or a camera configured to capture the upper body of the viewer may be required by the server 102 or preferred by the viewer, and a microphone configured to capture the viewer's voices in a regular volume or a microphone configured to capture the background sounds of the room where the viewer is located, which may come from electronic devices, pets, or other people, may be required by the server 102 or preferred by the viewer. The server 102 can be programmed to transmit such data related to input devices to a viewer computer before receiving viewer multimedia from the viewer computer or upon a redetermination of such data.

In some embodiments, the server 102 is programmed to aggregate viewer data, as the performance of an online activity can be viewed by a number of viewer accounts. Individual viewer items can be aggregated by viewer attributes or by player before the aggregate viewer item is classified into one of the viewer state. Alternatively, individual viewer items each corresponding to a certain time point can be classified first before being aggregated with respect to viewer states.

In some embodiments, the server 102 is programmed to build a training set for a digital model for classifying a viewer item as a portion of given viewer data that corresponds to a point during the performance of an online activity, into viewer states. As noted above, the viewer item can also be an aggregate of a number of viewer items as portions of given viewer data associated with multiple viewer accounts. The training set can include a certain number of viewer items, each viewer item comprising image vectors or sound vectors from a portion of the viewer multimedia within the given viewer data. A viewer item can further comprise encodings of a portion of the viewer metadata, even the static portion that does not often vary over time. The text or other types of data in the viewer metadata can be classified or encoded using existing analysis techniques specific to the data types before being included in the training set. For example, the viewer data may comprise more text data or speech data than the activity data or the player data, and such text data or speech data may be specifically evaluated using existing natural language processing techniques. Each viewer item can also be associated with a label of one of the viewer states. As discussed above, the server 102 can be programmed to construct the digital model from the training set of viewer items and associated labels using any supervised learning technique known to someone skilled in the art. An example of a digital model built based on a supervised learning technique is a CNN, which can be implemented using any of existing software packages corresponding to somewhat different architectures, such as InceptionNetV3. The server 102 can also be programmed to construct the digital model from the training set of viewer items using any unsupervised learning technique known to someone skilled in the art, such as k-means clustering.

4.3. Enhancement Related to Activity Data or Player Data

In some embodiments, the server 102 is programmed to associate each activity state with a score or a set of visual, auditory, or other sensory effects as multimedia effects. The score can indicate a level of relevance or significance of the activity state. The same score can be associated with the same set of visual or auditory effects. For example, a higher score can be associated with loud or high-pitched sounds while a lower score can be associated with dimming or fading visuals. Alternatively, each activity state can be associated with its own set of visual or auditory effects that are dependent on the nature of the activity state. The content of the activity multimedia in the activity state can be directly duplicated or amplified or can be translated into a certain expression specified by player accounts or viewer accounts to create the effects. For example, when the activity state corresponds to an achievement of a particular score in the online activity, the effect can be overlaying a magnified and flashing image of the score for a period of time; when the activity state corresponds to the arrival at a particular location in the virtual environment, the effect can be overlaying particular music that matches a mood evoked by the particular location for a period of time.

In some embodiments, the effects applied constitute additions to the activity multimedia in the foreground of the composite multimedia, changes (additions, deletions, updates, etc.) to the player multimedia in the foreground of the composite multimedia, or changes to the background of the composite multimedia (typically a rim around the foreground). The manner of applying an effect can depend on the nature or purpose of the effect. For visual effects, the nature or purpose could be automatically determined from the duration, visual attributes, such as the size, aspects of colors (number, intensity, contrast, etc.) or shapes (number, distance, sharpness, complexity, etc.), or specific contents. For auditory effects, the nature of purpose could be automatically determined from the duration, auditory attributes, such as the volume, pitch, frequency, timbre, number of channels, etc., or specific contents. Applying an effect to the relative expansive background (as opposed to a local region of the foreground) or player multimedia corresponding to a popular player (as opposed to player multimedia corresponding to an unpopular player) may have a greater impact, while applying an effect to the player multimedia can help synchronize the presentation of the player multimedia and the activity multimedia. For example, when the activity state corresponds to a treasure map being found, the effect can be showing some white confetti sprinkling down from above the player's head in the player multimedia in the foreground, while when the activity state corresponds to an entire sunken boat of treasures being uncovered, the effect can be showing colorful fireworks in the entire background. For further example, when the activity state corresponds to entering a cave, the effect can be reducing the lighting of the player multimedia in the foreground, when the activity state corresponds to encountering a particular vicious opponent, the effect can be putting on a pair of sunglasses or a facemask in the player multimedia, or when the activity state corresponds to repeatedly getting lost in the woods or making other mistakes, the effect can be showing a callout stating "What am I thinking?" near the player multimedia in the foreground.

In some embodiments, the server 102 is programmed to associate each player state with a score or a set of visual, auditory or other sensory effects as multimedia effects. The score can indicate a level of relevance or significance of the player state. The same score can be associated with the same set of visual or auditory effects. For example, a higher score can be associated with happy tunes or rainbow tints, while a lower score can be associated with dimming or fading visuals. Alternatively, each player state can be associated with its own set of visual or auditory effects that are dependent on the nature of the player state. The content of the player multimedia in the player state can be enhanced or magnified to create the effects. For example, when the player state corresponds to the player making a hand gesture, the effect can be momentary zooming in on the hand or brief replaying of the hand gesture; when the player state corresponds to the player frowning, the effect can be overlaying dark clouds with thunders.

In some embodiments, the effects applied constitute additions to the activity multimedia in the foreground of the composite multimedia, changes to the player multimedia in the foreground of the composite multimedia, or changes to the background of the composite multimedia. The manner of applying an effect can depend on the nature or purpose of the effect. For visual effects, the nature or purpose could be automatically determined from the duration, visual attributes, such as the size, aspects of colors or shapes, or specific contents. For auditory effects, the nature of purpose could be automatically determined from the duration, auditory attributes, such as the volume, pitch, frequency, timbre, number of channels, etc., or specific contents. Applying an effect to the relatively expansive background or player multimedia corresponding to a popular player may have a greater impact, while applying an effect to the player multimedia can help synchronize the presentation of the player multimedia and the activity multimedia. For example, when the player state corresponds to the player looking smiley, the effect can be adding some lighthearted music to the existing mix of sounds, when the player state corresponds to the player looking hyper intense, the effect can be darkening the background of the composite multimedia, or when the player state corresponds to the player disappearing from the player desk, the effect can be showing a sign stating "Be back soon . . . " or "Where did the player go?" in the foreground of the composite multimedia. For further example, when the player state corresponds to the player looking motivated and the performance of the online activity is approaching a state that corresponds to obtaining a truck load of weapons, the effect can be flashing images of some weapons to the player multimedia. In other embodiments, the server 102 is programmed to specifically associate a combination of a player state and an activity state with a score or a set of visual or auditory effects in similar manners.

In some embodiments, as the player data and the activity data is generally of main interest to viewer accounts, the viewer data is not typically individually incorporated into the composite multimedia but can be selectively shown in aggregated form as additional effects based on preferences associated with a player account, a viewer account, or default rules of the server 102, as further discussed below. As noted above, the aggregation can be performed with respect to viewer attributes or players, and an effect can be overlaying information regarding the viewer state identified for the aggregate. Alternatively, the aggregation can be performed with respect to viewer states, and an effect can thus be overlaying aggregation statistics related to the viewer states.

In some embodiments, the server 102 is programmed to adjust the score associated with an activity state, player state, or a combination thereof based on feedback from viewer accounts. The server 102 can be programmed to determine which activity state, player state, or a combination thereof receives more favorable feedback from viewer accounts based on the aggregation noted above or using another existing trend analysis technique known to someone skilled in the art. The score associated with an activity state, a player state, or a combination thereof can be adjusted based on the feedback received over a past period of time. Such a score can also be adjusted in real time only as applied to certain activity multimedia, player multimedia, or a combination thereof in the composite multimedia based on feedback directed to the certain activity media, player media, or a combination thereof. The server 102 can be programmed to then identify the visual or auditory effects associated with adjusted score. For example, when a certain player's exaggerated laugh (player state) upon obtaining every little treasure in the online activity (activity state) receives a relatively number large of user votes, the score associated with this combination of player state and activity state can be raised, and the associated effect may switch from overlaying a video of opening a bottle of champagne to overlaying a video of a displaying a firework.

In some embodiments, the server 102 is programmed to evaluate the player data, the activity data, the viewer data, or a combination thereof to generate additional effects. The server 102 can be programmed to evaluate the relationship between the physical expressions or actions of the player captured in the player multimedia or otherwise indicated in the player data and the physical expressions or action of the player's digital representation in the activity multimedia or other activity data and create alerts for certain types of relationships as additional effects. The player data or a player item as a portion thereof and the activity data or an activity item as a portion thereof that are being evaluated can correspond to time points within a relatively small range to catch the player's reaction to an ongoing online activity. Such evaluation can include applying an existing similarity or distance measure to a player state into which the player item is classified and an activity state into the activity item is classified and determine whether the result is above a certain threshold, or applying a correlation or regression technique over multiple ranges of time. Specifically, alerts can be created when there is a distinct contrast or discrepancy between the player item and the activity item that are being evaluated. For example, the player may show no sign of delight even if the player's digital representation keeps winning in the online activity, the player may seem panicky when the player's digital representation enters a bright and peaceful state in the online activity, or the player may seem distracted when team members of the player's digital representation are engaged in a violent fight in the online activity. The alerts can be presented as notices, alarms, or requests. For example, an alert may be showing a highlight of the player's unusual facial expression, a message describing the contrast or discrepancy, or a multiple-choice question asking a viewer to guess what is going on or predict how the player is going to behave next.

In some embodiments, the server 102 can be programmed to also evaluate the relationship between the physical expressions or actions of a player captured in the player multimedia or otherwise indicated in the player data or the physical expressions or action of the player's digital representation in the activity multimedia or other activity data and the viewer feedback captured in the viewer multimedia or other viewer data and create alerts for certain types of relationships as additional effects. The player (activity) data or a player (activity) item as a portion thereof and the viewer data associated one or more viewer accounts or an aggregate viewer item over portions thereof can correspond to time points within a relatively small range to capture the player's reaction to ongoing viewer feedback or reactions of one or more viewers to the player's participation in the online activity or the player's reaction to the ongoing online activity. Such evaluation can include applying an existing similarity or distance measure to a player (activity) state into which the player (activity) item is classified and a viewer state into the aggregate viewer item is classified and determine whether the result is above a certain threshold, or applying a correlation or regression technique over multiple ranges of time. Specifically, alerts can be created when there is a specific agreement or disagreement between the player (activity) item and the viewer item. For example, the player's digital representation may continue pursuing a first type of reward even if the viewer feedback favors the pursuit of a second type of reward in the online activity, or the player may do a happy dance more frequently upon when the player's digital representation finds a treasure in the online activity when the viewer feedback strongly favors such player's reaction to finding a treasure. For further example, the one or more viewers may show strong signs of disapproval when a popular player's digital representation wins in the online activity or when the player shows a reaction that received favorable viewer feedback before. The alerts can be presented as a notice, an alarm, or a request. For example, an alert may be showing a quick report of the unusual viewer feedback, a message describing the disagreement, or a multiple-choice question asking a viewer to clarify what the viewer is thinking or what the viewer would like the player or the player's digital representation to do next.

In some embodiments, the server 102 can be programmed to evaluate the identified player relationships each indicating a communication from one player to another in participating in an online activity captured in player multimedia or other player data associated with multiple player accounts to create additional effects. As the players may not be positioned in the same location, such a communication can be one-way, and the server 102 can be programmed to show a commentary on funny or ironic moments that may arise from such one-way communication. For example, when the player data associated with two player accounts or two player items as portions thereof show that two players happen to be yelling at each other at the same time in their respective rooms, an effect can be overlaying a message that states "Look at these two players who can't stop yelling at each other"; when the two player items show that a first player keeps calling out a second player while the second player appears to remain silent and aloof, the effect can be overlaying a message that states "Does the second player care about the first player at all?". Alternatively, the server 102 can be programmed to transmit a communication made by a first player and directed at a second player received from the player computer of the first player to the player computer of the second player, to enable two-way communication.

4.4. Production of Multimedia of Physical Expressions or Actions of Players or Participation of Players in Online Activities In some embodiments, the server 102 is programmed to determine how to fully produce the composite multimedia from the activity multimedia, the player multimedia, and viewer multimedia, and any associated effects. To enable real-time production and live streaming, the server 102 is programmed to repeat such determination near continuously over a relatively small period of time, such as one or two seconds, each time working with an activity item and a player item corresponding to the relatively small period from each of one or more player computers of players actively participating in an ongoing online activity. The activity item would contain a portion of activity data and the player item would contain a portion of player data generated during or near the relatively small period. The server 102 can be programmed to initially determine an arrangement of the video portion of the activity item ("activity video") and the video portion of the player item ("player video") as the visual layout of the composite item of the activity item and the player item. The determination can be based on various attributes of the activity data, the player data, the viewer data, or a combination thereof. The attributes may include the relative complexity or significance of the activity video and player video, timing to which the videos corresponds, preferences of player accounts or viewer accounts on video production, relative predicted or actual interest in the activity video and player video from viewer accounts, or other aspects similarly considered in determining effects for the composite multimedia, as discussed above. As the layout specifies how the activity video and the player video are displayed relatively to each other, the layout can be considered to have a more global scope, while any determined effect can be considered as having a more local scope. In general, the activity video or the player video can be transformed as necessary using existing image processing techniques in order to satisfy the layout specification.

In some embodiments, the server 102 is programmed to determine an arrangement of the video portion of the activity item and the player item based mainly on the activity state of the activity item.

Figure 3:
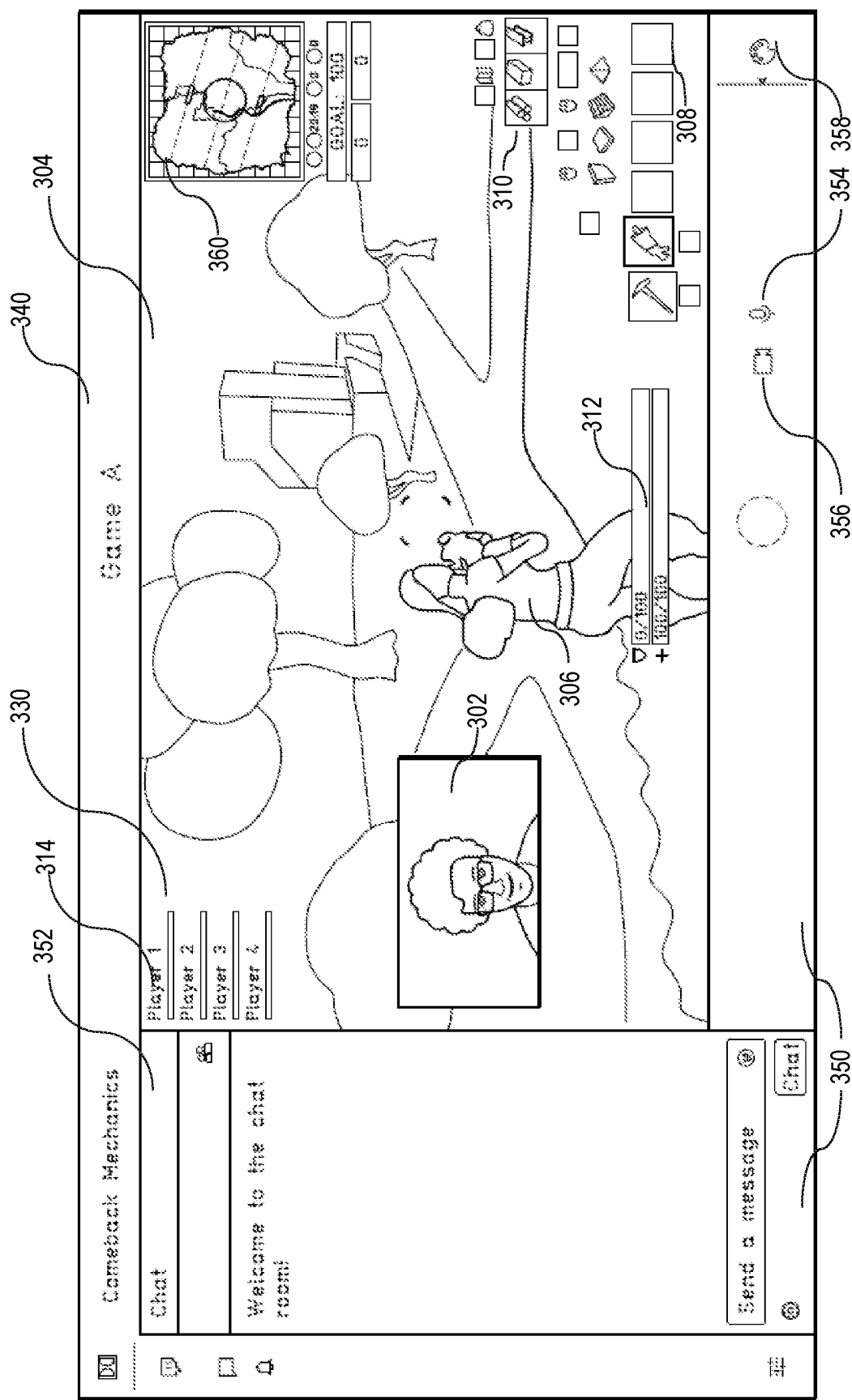
FIG. 3 illustrates an example gameplay screen of a graphical user interface (GUI) that presents multimedia corresponding to a state where a player is actively participating in the online activity.
Figure 4:
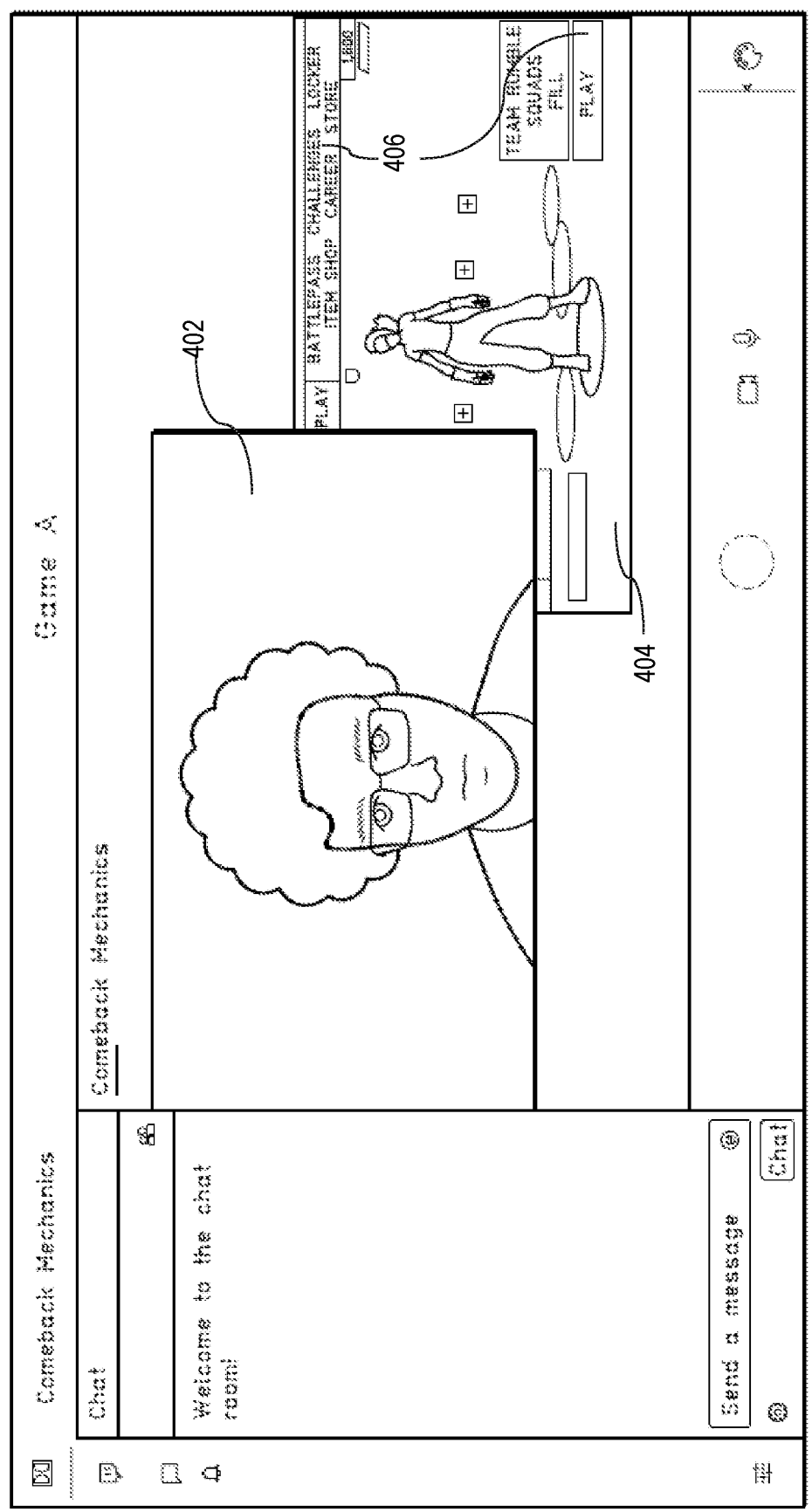
FIG. 4 illustrates an example menu screen of a GUI that presents multimedia corresponding to a state where a player can select a menu option associated with performance of the online activity.
Figure 5:
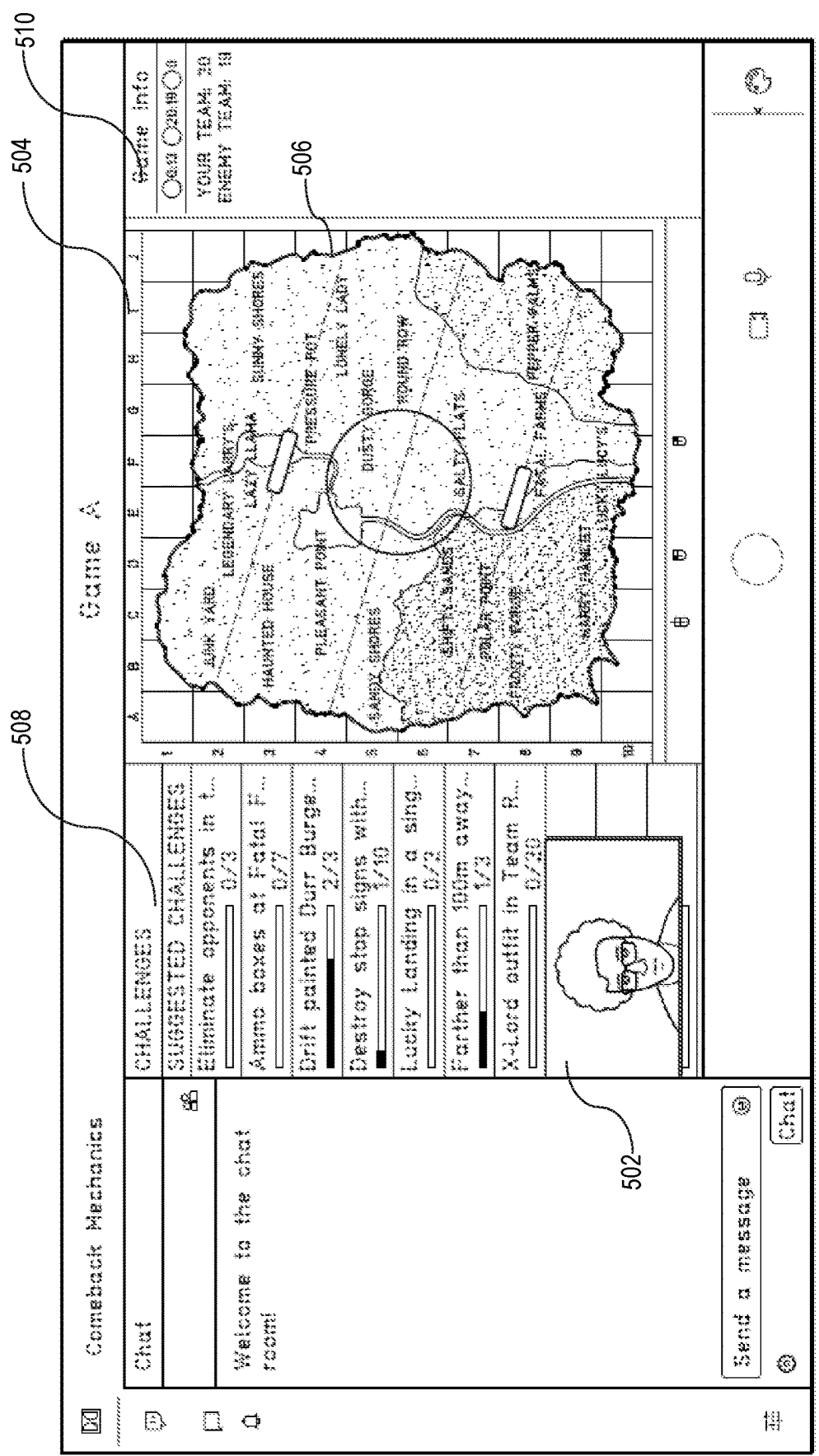
FIG. 5 illustrates an example map screen of a GUI that presents multimedia corresponding to a state where a player can examine a map for performance of the online activity.
Figure 6:
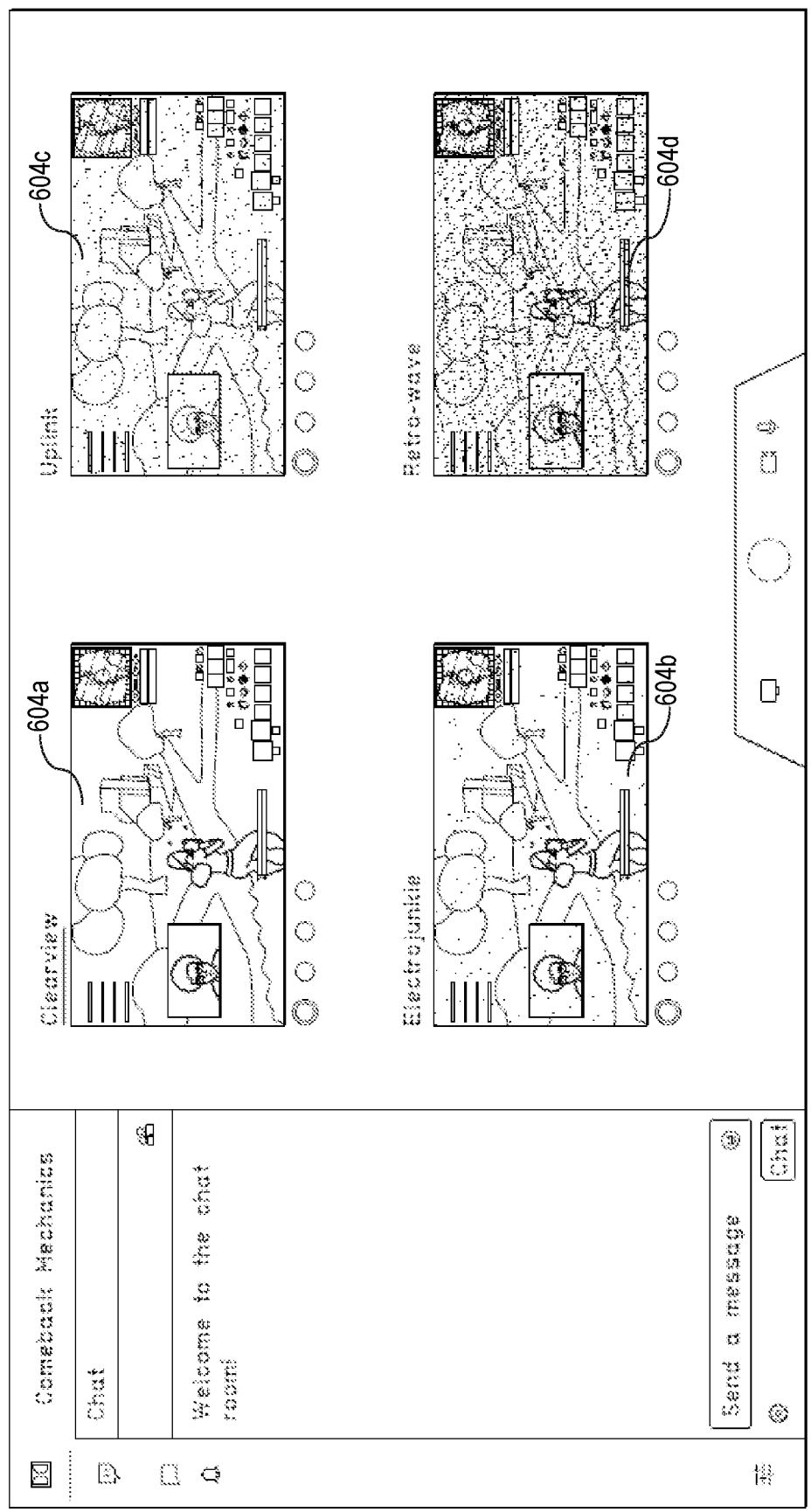
FIG. 6 illustrates an example themes screen of a GUI that allows a player selection of a presentation theme for the presentation of multimedia related to a player's participation in an online activity and the physical expressions or actions of the player in participating in the online activity.

FIG. 3, FIG. 4, FIG. 5, and FIG. 6 illustrate different layouts corresponding to different activity states. FIG. 3 illustrates an example gameplay screen of a graphical user interface (GUI) that presents multimedia corresponding to a state where a player is actively participating in the online activity. FIG. 4 illustrates an example menu screen of a GUI that presents multimedia corresponding to a state where a player can select a menu option associated with performance of the online activity. FIG. 5 illustrates an example map screen of a GUI that presents multimedia corresponding to a state where a player can examine a map for performance of the online activity. FIG. 6 illustrates an example themes screen of a GUI that allows a player selection of a presentation theme for the presentation of multimedia related to a player's participation in an online activity and the physical expressions or actions of the player in participating in the online activity.

Referring back to FIG. 3, in some embodiments, the GUI may include, for a given time point, a composite video 330 as the video portion of a composite item and a viewer feedback area 350. The composite item 330 can include a foreground with a player video 302 as the video portion of a player item with associated effects and an activity video 304 as the video portion of the player item with associated effects. The composite item 330 also can include a background 340 where certain effects can also be applied.

The online activity in this example is a computer game. The activity video 304 in this example includes a scene of the computer game, indicating the player's digital representation 306 (and its physical expressions, actions, or location), an ammunition status 308 of the ammunitions of the player's digital representation, an award status 310 of the awards of the player's digital representation, a health status 312 of the health of the player's digital representation, and a competition status 314 of progress corresponding to multiple players simultaneously playing the computer game. All of these items included in the activity video 304 can be specifically included in the activity item and used to identify an activity state for the activity item. The foreground in this example also includes a thumbnail of a map 360 for the current state of the computer game, which can be expanded and further discussed with respect to FIG. 5.

The player video 302 in this example is multimedia capturing the player's physical expressions or actions while playing the computer game (or shortly before or afterwards). The player video 302 in this example includes a view of the player's head, indicating the player's facial expressions and possibly upper-body gestures. When multiple cameras are coupled to the player's computer and capture different views of the player, the player video 302 correspond to one or more of those views at a given time.

The viewer feedback area 350 includes various tools corresponding to input devices for a viewer to provide feedback, which can be related to a player's current, past, or future physical expressions or actions or the player's digital representation's current, past, or future physical expressions or actions in the online activity. In this example, the viewer feedback area 350 includes a chat area 352 for conversing with certain other viewers mainly through a keyboard, a microphone icon 354 for enabling or disabling a microphone associated with the viewer's account to capture the viewer's sounds, a camera icon 356 for enabling or disabling a camera associated with the viewer's account to capture the viewer's looks, and a drawing icon 358 enabling or disabling a digital drawing tool to be presented. The data captured by these input devices can be included in the viewer data.

In FIG. 3, the activity state is "gameplay", as noted above. In some embodiments, this activity state involves performance of an online activity and specifically a player's participation in an online activity. Either the activity video or the player video can be of high interest. As the activity video usually has a larger size than the player video, the layout for this activity state can assign a relatively large region of the composite video to the activity video and a relatively small region of the composite video to the player video. In this example, a relatively large region is allocated to the player video 302, and a relatively small region is allocated to the activity video 304. To ensure that the player video 302 that is already in a relatively small region is on full display, the player video 302 is placed on top of an area of the activity video 304 that is deemed to be part of the background of the player video 304.

In FIG. 4, the activity state is "menu", as noted above. In some embodiments, this activity state may be related to specific performance of an online activity and may occur before or after an activity state that involves a player's participation in an online activity or between two such activity states. As menu options are typically straightforward while the player's physical expressions or actions may be of interest, the layout for this activity state can assign a relatively large or prominent region of the composite video to the player video and a relatively small or insignificant region of the composite video to the activity video. For example, the menu may be presented between stages of a computer game for a player to decide between two options of whether to advance to the next stage or cash out the prizes obtained so far, and the player's anxious look to advance to the next stage or agonized look in not being able to determine which option to take may be of high interest to viewers. In this example, a relatively large or prominent region is allocated to the player video 402, and a relatively small or insignificant region is allocated to the activity video 404 including the menu options 406. To feature the player video 402, the player video 402 is placed near the center of a screen, and the activity video 404 is placed to the back of the player video 402 to maintain a proper resolution without obscuring any of the player video 402.

In FIG. 5, the activity state is "map", as noted above. In some embodiments, this activity state may be related to specific performance of an online activity and typically occurs between two activity states that involve a player's participation in an online activity. Either the activity video or the player video can be of high interest. On the one hand, as the map can have as much information as a scene of the online activity, the layout for this activity state can assign a relatively large region of the composite video to the activity video and a relatively small region of the composite video to the player video, as in the "gameplay" activity state. As the player is more of evaluating information related to the performance of the activity than participating in the online activity, the layout for this activity state can assign an even smaller region of the composite video to the player video compared to the "gameplay" activity state. On the other hand, as a static map is potentially less appealing than a scene of an ongoing gameplay, the layout for this activity state can be more flexible with which region to assign of the composite video to the player video each time the "map" activity state is encountered, such as providing a viewer account with a greater ability to reposition the player video, as further discussed below. In this example, a relatively large region is allocated to the player video 502, and a pretty small region is allocated to the activity video 403. The activity video 504 includes a map 506 and other related items, such as a list of activity alerts 508 and a scoreboard 510. To enable a full view of the map, the player video 502 is positioned not to obscure the display of the map.

In FIG. 6, the activity state is "themes", as noted above. In some embodiments, this activity state does not involve specific performance of an online activity and generally occurs before another activity state that involves a player's participation in an online activity. As the player is conceivably not yet ready for participating in the online activity and the player's physical expressions or actions may be of no interest, the layout for this activity state can assign little or no region of the composite video to the player video and most or all of the area of the composite video to the activity video. In this example, no region is allocated to the player video, and almost the entire region is allocated to the activity video in four selectable presentation themes, 604a, 604b, 604c, and 604d.

In some embodiments, the server 102 is similarly programmed to determine an arrangement of the activity video and the player video based on the player state of the player item alone or combined with the activity state of the activity item. The layout can similarly assign a relatively large or prominent region of the composite video to the player video when the player state corresponds to the player's physical expressions or actions being exaggerated, unusual, highly anticipated, or largely favored. Similarly, the layout can assign a relatively small or insignificant region to the player video when the player state corresponds to the player's physical expressions or actions being bland, distracted, or largely disfavored. In certain embodiments, the server 102 can be programmed to next select a region for the activity video. The layout can assign a region of the composite video to the activity video that does not obscure the player video. The activity state of the activity video can be used to further determine the size, shape, or precise location of the region assigned to the activity video. The server 102 can be programmed to avoid any overlap between the player video and the player's digital representation in the activity video. The server 102 can be programmed to place the player video to give the impression that the player is staring at the player's digital representation or another object or location in the activity video. The server 102 can be programmed to also place the player video to make it easier for a viewer to view the player video and where an event occurs in the activity video near simultaneously. In other embodiments, the server 102 can be programmed to determine an arrangement of the activity video and the player video based on the arrangements determined for the immediately preceding time points to facilitate a smooth transition.

In some embodiments, the server 102 is programmed to determine an arrangement of the audio portion of the activity item ("activity audio") and the audio portion of the player item ("player audio") as the auditory mix of the composite item of the activity item and the player item. The arrangement can be simply balancing or harmonizing the activity audio and the player video to appeal to viewers, as is typically done in combining different soundtracks. The arrangement can also be based on the arrangement of the corresponding activity video and player video in that when a relatively large or prominent region is assigned in the visual layout, an amplification of certain audio attribute values of the corresponding audio, such as volume, frequency, pitch, or timbre, could also be assigned to the corresponding audio, and when a relatively small or insignificant region is assigned, a reduction of certain audio attribute values of the corresponding audio can also be assigned to the corresponding audio. The server 102 can be programmed to determine the arrangement of the activity audio and the player audio specifically based on the player state, as the sounds made by a player can be more personal, varied, or unpredictable and thus more appealing than the sounds produced during performance of the online activity. For example, any sounds made by the player can be promoted in some way to ensure that it is heard over other sounds in the composite audio.

Figure 7:
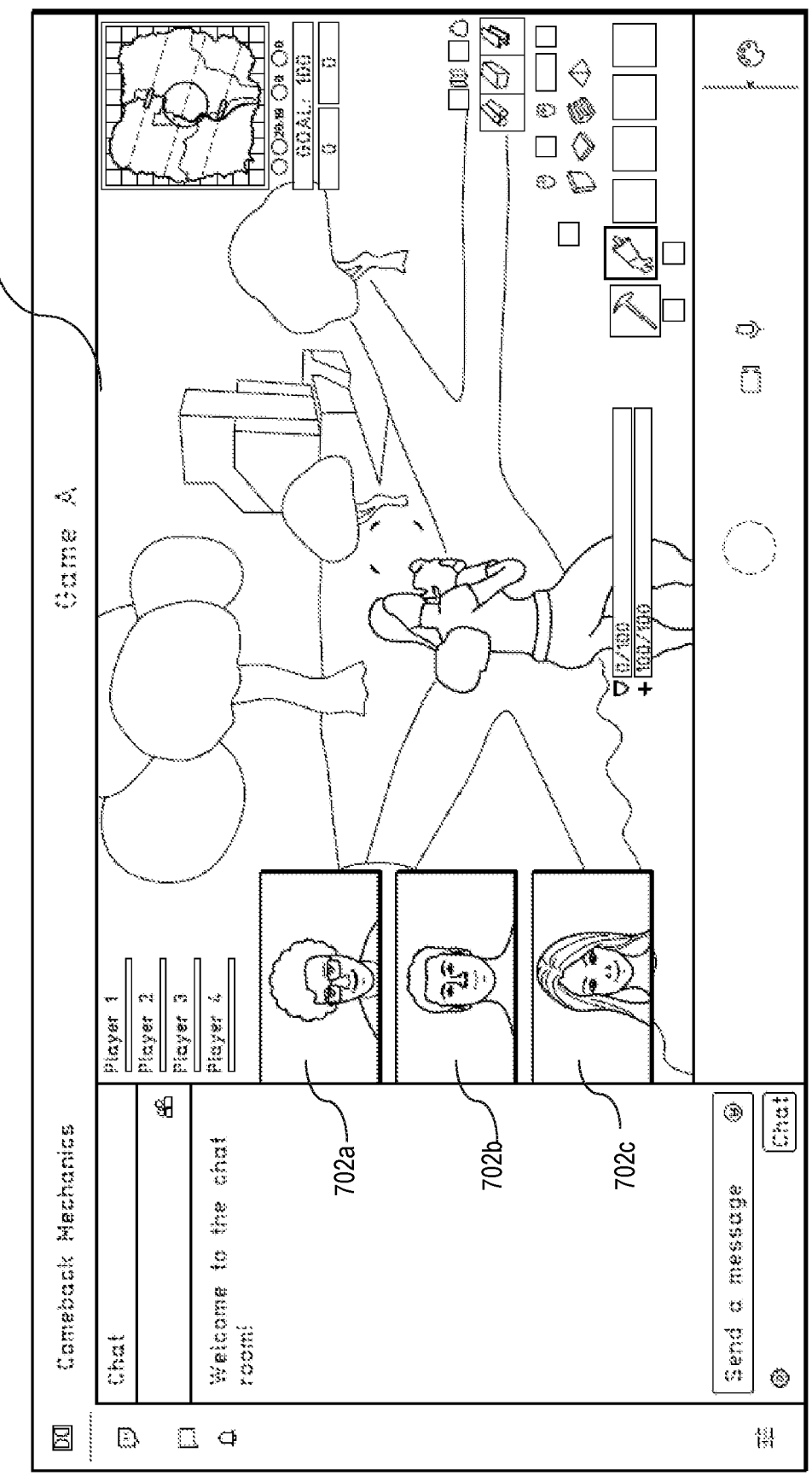
FIG. 7 illustrates another example gameplay screen of a GUI that presents multimedia corresponding to a state where multiple players are actively participating in the online activity.

FIG. 7 illustrates another example gameplay screen of a GUI that presents multimedia corresponding to a state where multiple players are actively participating in the online activity.

The screen illustrated in FIG. 7 is to the screen illustrated in FIG. 3 except that the screen illustrated in FIG. 7 shows multiple player videos of multiple players participating in the online activity. In some embodiments, the server 102 is programmed to adjust the layout when the player multimedia associated with multiple player accounts are to be incorporated into the composite multimedia based on the relative complexity, significance, or desirability of the player multimedia or activity multimedia associated with the different player accounts, the player relationships, or the overall status of the online activity. The activity multimedia associated with the multiple player accounts can be incorporated selectively. In certain embodiments, a distinct region of the composite video can be assigned to each player account to incorporate both the corresponding player video and the activity video, while the size or the position of the distinct region can depend on how popular the player is, how appealing the player's physical expressions or actions are, whether the player is communicating to another player, or how exciting the player's participation is in the online activity. In other embodiments, a distinct region of the composite video along the border can be assigned to each player account to incorporate the corresponding player video, and the central region of the composite video can incorporate the activity video that has the most interesting content or that corresponds to the player video that deserves the most attention. In this example, a relatively small region is allocated each of the player videos 702a, 702b, and 702c associated with multiple player accounts. A relatively large region is allocated to the activity video 704, which is associated with one of the multiple player accounts. Each of the regions allocated to a player video can be on top of a portion deemed as a background of the activity video.

In some embodiments, after determining an arrangement of the activity item and the player item, the server 102 can be programmed to determine or apply additional effects to form the final composite item, including those effects based on viewer data, as noted above. For example, when an effect based on the viewer data is specifically related to the player item associated with a particular player account of a player or any object or location depicted in the activity item, the effect can be shown near the player item or the portion of the activity item of interest.

In some embodiments, the server 102 is programmed to then transmit the composite item to one or more viewer computers associated with one or more viewer accounts, which can be based on a subscription or a specific request from a viewer account. The server 102 is programmed to also receive viewer data from viewer computers in response to the received composite item, which can be stored or analyzed to improve future production of the composite multimedia, as discussed above. Specifically, the viewer data can include feedback on aspects of the composite item that have more of a global scope. For example, the feedback can be a movement or resizing of the region assigned to the activity item or player item. In certain embodiments, similar to the classification of an activity item or a player item discussed above, the server 102 can be programmed to initially define a plurality of visual layout states, which may be related to viewer states. The server 102 can be programmed to then prepare a training set of combination items with associated labels, where each combination item includes attributes of the activity item or the player item incorporated into a composite item, such as the activity state of the activity item and the player state of the player item, and each label has a value corresponding to one of the visual layout states specified based on viewer feedback on the composite item. The server 102 can be programmed to next build a digital model, such as a CNN, for classifying a combination of an activity item and a player item into one of the visual layout states using the training set of combination items and the associated labels.

In some embodiments, the server 102 can be programmed to also send information related to the viewer data to the player computers associated with the player participating in the online activity, such as aggregate statistics or specific recommendations based on highlights of aggregate statistics, and track player behavior against viewer feedback, as discussed above.

In some embodiments, the server 102 is programmed to transmit alternative content to viewer computers instead of a composite item produced in real time based on live contents. The server 102 can be programmed to compute an enjoyment index for each constructed composite item that indicates how appealing the composite item is likely to be to viewer accounts. The computation can similarly be based on the complexity, significance, or desirability of the composite item with respect to aggregate viewer data or viewer data associated with individual viewer accounts. Certain low enjoyment indices can correspond to the player being absent, the performance of the online activity being on a break, or an unpopular player being active in the online activity. Certain high enjoyment indices can correspond to multiple players' digital representations engaging in a fight in the online activity, a player's digital representation taking a series of actions to achieve a high score in the online activity, or a player's doing a funky happy dance. The server 102 can be programmed to further track the number of consecutive composite items where a certain proportion of the associated enjoyment indices are above a first enjoyment threshold, and when the number exceeds a first duration threshold save the series of consecutive composite items as an "enjoyment reel". The server 102 can be programmed to also track the number of consecutive composite items where a certain proportion of the associated enjoyment indices are below a second enjoyment threshold, and when the number exceeds a second duration threshold start transmitting a stored enjoyment reel. The server 102 can be programmed to additionally estimate the proportion of consecutive composite items with computed enjoyment indices below the second threshold are to follow, and select an enjoyment reel having a specific duration based on the estimate. The estimate can be based on activity metadata in activity data. For example, a particular stage of an online activity may have a fixed duration. The estimate can also be based on past measurements from the activity data or player data. For example, it may be determined that historically the player takes a bathroom break for five minutes or it takes twenty minutes for a player's digital representation to reach an advanced stage. Alternatively, the server 102 can be programmed to terminate the transmission of an enjoyment reel in response to a new composite item with an enjoyment index that is no longer below the second enjoyment threshold or higher than the first enjoyment threshold.

5. Example Processes

Figure 8:
FIG. 8 illustrates an example process performed by the multimedia management server computer of automatic multimedia production.

FIG. 8 illustrates an example process performed with a multimedia management server computer of automatic multimedia production in accordance with some embodiments described herein. FIG. 8 is shown in simplified, schematic format for purposes of illustrating a clear example and other embodiments may include more, fewer, or different elements connected in various manners. FIG. 8 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skills and knowledge.

In some embodiments, in step 802, the server 102 is programmed or configured to define a plurality of activity states related to participating in an online activity. The online activity can be a computer game, for example. The plurality of activity states can include an activity state that corresponds to a stage or an event of the online activity or an object or a location represented in the online activity.

In some embodiments, the server 102 is programmed to build a digital model for classifying a particular activity item corresponding to a particular time point into a particular activity state of the plurality of activity states using a machine learning technique.

In some embodiments, in step 804, the server 102 is programmed or configured to define a plurality of player states related to physical expressions or actions of a player participating in the online activity. The plurality of player states can include a player state that corresponds to a physical expression or action, a sentiment, or an apparent mental state.

In some embodiments, the server is programmed to build a digital model for classifying a particular player item corresponding to a particular time point into a particular player state of the plurality of player states using a machine learning technique.

In some embodiments, in step 806, the server 102 is programmed or configured to receive activity data including activity multimedia associated with each of one or more player accounts of players participating in the online activity. The activity multimedia represents live participation in the online activity over a certain period. The activity multimedia is received continuously as the online activity is being performed.

In some embodiments, the activity data can include activity metadata for the online activity created by an activity provider computer and accessible through an application programming interface (API) provided by the activity provider computer.

In some embodiments, in step 808, the server 102 is programmed or configured to receive player data including player multimedia associated with each of the one or more player accounts. The player multimedia captures live physical expressions or actions of a player of a player account during the player's participation in the online activity over the certain period. The player multimedia is received continuously as the online activity is being performed.

In some embodiments, the player multimedia associated with a player account of a player can include multiple feeds from multiple sensors located at or near a location of the player. The multiple sensors can a microphone, a camera, a keyboard, a thermometer, a heart rate monitor, or an eye-tracking device.

In some embodiments, the player data associated with a player account of a player can include player metadata for the player that indicates demographic information, one or more playing habits related to the online activity, or one or more preferences related to the online activity. The one or more preferences can be associated with player presentation, composite multimedia generation, or viewer feedback. The one or more preferences being associated with composite multimedia generation can be related to use of input devices to generate corresponding player multimedia, visual or auditory theme or effects to use for the corresponding player multimedia, positioning of the corresponding player multimedia relative to corresponding activity multimedia in the composite multimedia, expressions, gestures, or speech captured in the corresponding player multimedia to be manifested or avoided, or objects, actions, or scenes depicted in the corresponding activity multimedia to be manifested on or deemphasized.

In some embodiments, in step 810, the server 102 is programmed or configured to identify, at or near each time point of a plurality of time points within the certain period, an activity state of the plurality of activity states for each activity item being a portion of the activity data associated with each player account of the one or more player accounts that is produced at or near the time point. The identifying an activity state for each activity item then comprises applying the digital model to the activity item.

In some embodiments, in step 812, the server 102 is programmed or configured to identify, at or near each time point of a plurality of time points within the certain period, a player state of the plurality of player states for each player item being a portion of the player data associated with each player account of the one or more player account that has live coverage corresponding to the time point. The identifying a player state for each player item then comprises applying the digital model to the player item.

In some embodiments, in step 814, the server 102 is programmed or configured to select, at or near each time point of the plurality of time points, a segment of an activity item or a segment of a player item from the one or more activity items or the one or player items corresponding to the time point to form a foreground of a composite item based on the corresponding one or more activity states or the one or more player states. The selecting can be further based on the one or more preferences in the player data.

In some embodiments, the selecting can comprise determining an arrangement of the segment of the activity item and the segment of the player item in the composite item based on the activity state of each of the one or more activity items.

In some embodiments, the arrangement includes a visual layout of the composite item in terms of the segment of the activity item and the segment of the player item. The plurality of activity states can include a menu state, a gameplay state, and a map state. When the activity state identified for the activity item is the menu state, the arrangement assigns a first region that is smaller or further from a center of the composite item to the segment of the activity item and a second region that is larger or closer to the center of the composite item to the segment of the player item. When the activity state identified for the activity item is the gameplay state, the arrangement assigns a first region that is larger or closer to the center of the composite item to the segment of the activity item and a second region that is smaller or further from the center of the composite item to the segment of the player item. When the activity state identified for the activity item is the map state, the arrangement assigns a first region to the segment of the activity item including a map and a second region that does not overlap with an area within the first region assigned to the map to the segment of the player item.

In some embodiments, the arrangement further includes an audio mix of the composite item in terms of the segment of the activity item and the segment of the player item. The audio mix can magnify values of one or more audio characteristics of the segment of the activity item and the segment of the player item based on a visual layout of the composite item in terms of the segment of the activity item and the segment of the player item.

In some embodiments, the selecting can comprise assigning a player region of the composite item to the segment of the player item based on the player state of each of the one or more player items. The selecting can further comprise, after assigning the player region, assigning an activity region of the composite item to the segment of the activity item based on the activity state of each of the one or more activity items, a display of the activity region not obscuring a display of the player region.

In some embodiments, the server 102 is programmed to determine, at or near each time point of the plurality of time points, a visual effect or an auditory effect from the segment of the activity item or the segment of the player item. The server 102 is programmed to further apply the visual effect or auditory effect to the composite item as an addition to the segment of the activity item, a change to the segment of the player item, or a change to a background of the composite item. The determining an auditory effect can comprise selecting audio data that corresponds to a video portion of the segment of the player item or that clarifies, complements or amplifies an audio portion of the segment of the player item. The determining a visual effect can comprise selecting video data that hides an identity of the player, indicates an absence of the player, matches a first value of a visual characteristic of a video portion of the segment of the player item with a second value of the visual characteristic of a video portion of the segment of the activity item, or clarifies the video portion of the segment of the player item or the video portion of the segment of the activity item.

In some embodiments, in determining a visual or an auditory effect, the server 102 is programmed to detect a discrepancy or disagreement between an expected reaction of a player to the player's participation in the online activity depicted in the segment of the activity item and an actual reaction of the player captured in the segment of the player item, or between a physical expression or action of a digital representation of the player in the online activity in the segment of the activity item and a physical expression or action of the player captured in the segment of the player item. The server 102 is programmed to further generate an alert of the discrepancy or disagreement as an additional effect.

In some embodiments, in step 814, the server 102 is programmed or configured to transmit, at or near each time point of the plurality of time points, a piece of multimedia based on the composite item to one or more viewer accounts of one or more viewers of performance of the online activity, the plurality of pieces of multimedia over the plurality of time points forming composite multimedia.

In some embodiments, the server 102 is programmed to define a plurality of viewer states related to a viewer of performance of the online activity. The plurality of viewer states can include a viewer state being related to the activity data incorporated into the composite multimedia, the player data incorporated into the composite multimedia, or the composite multimedia and associated with a sentiment type.

In some embodiments, the server 102 is programmed to build a digital model for classifying a particular activity item corresponding to a particular period of time into a particular viewer state of the plurality of viewer states using a machine learning technique.

The server 102 is programmed to then receive viewer data including viewer multimedia associated with each of the one or more viewer accounts of viewers viewing the composite multimedia during the certain period. The viewer multimedia can capture a live physical expression or action of a viewer of a corresponding viewer account during the viewer's viewing of the composite multimedia over the certain period. The viewer multimedia can be received continuously during the performance of the online activity. The viewer multimedia can include one or more feeds from one or more sensors located at or near a location of a viewer of a viewer account of the one or more viewer accounts. The one or more sensors can include a microphone, a camera, a keyboard, a thermometer, a heart rate monitor, or an eye-tracking device. The viewer multimedia associated with a viewer account of the one or more viewer accounts can include contents of a social media account associated with the viewer account.

In some embodiments, the viewer data associated with a viewer account of a viewer can include viewer metadata for the viewer that indicates demographic information, one or more viewing habits related to the online activity, or one or more preferences related to the online activity. The one or more preferences can be associated with composite multimedia generation or viewer feedback. The one or more preferences associated with multimedia generation can be related to a selection of which player's player multimedia to feature or avoid or which players' player multimedia to combine in the composite multimedia, positioning of the player multimedia relative to the activity multimedia in the composite multimedia, expressions, gestures, or speech to be manifested on or avoided in the player multimedia, or objects, actions, or scenes to be manifested on or deemphasized in the activity multimedia.

In some embodiments, the server 102 is programmed to compute an aggregate viewer item of a plurality of viewer items being portions of the viewer data associated with the one or more viewer accounts corresponding to a certain period of time. The server 102 is programmed to further identify a viewer state of the plurality of viewer states for the aggregate viewer item. The identifying a viewer state for the aggregate viewer item can comprise applying the digital model to the aggregate viewer item.

In some embodiments, the selecting a segment of an activity item or a segment of a player item to form a foreground of a composite item comprises determining an arrangement of the segment of the activity item and the segment of the player item in the composite item based on the activity state of each of the one or more activity items or the player state of each of the one or more player items. The selecting can also be based on the one or more preferences in the viewer data. In addition, the selecting can be based on the viewer state identified for the aggregate viewer item. The receiving viewer data can comprise receiving viewer feedback in real time to update the arrangement.

In some embodiments, the server 102 is programmed to define a plurality of arrangement states related to an arrangement of an activity item and a player item corresponding to a time point. The server 102 is programmed to then build a digital model for classifying a particular combination of an activity item and a player item corresponding to a particular time point into a particular arrangement state of the plurality of arrangement states based on the viewer feedback using a supervised machine learning technique.

In some embodiments, the server 102 is programmed to determine, at or near each time point of the plurality of time points, a visual effect or an auditory effect from the aggregate viewer item. The server 102 is programmed to then apply the visual effect or the auditory effect to the composite item as an addition to the segment of the activity item, a change to the segment of the player item, or a change to a background of the composite item. The visual effect or auditory effect can be presenting a request or a question for view accounts related to the segment of the activity item, a segment of the player item, or a combination thereof.

In some embodiments, the server 102 is programmed to transmit viewer data related to a specific player account of the one or more player accounts to the specific player account. The server 102 can be programmed to compute an aggregate viewer item of a plurality of viewer items being portion of the viewer data associated with the one or more viewer accounts and related to a specific player account corresponding to a specific period of time. The server 102 can be programmed to further identify a viewer state of the plurality of viewer states for the aggregate viewer item. In addition, the server 102 can be programmed to generate a recommendation for future participation in the online activity of a specific player account or future physical expressions or actions of a specific player of the specific player account based on the viewer state. The server 102 can be programmed to then transmit the recommendation to the specific player account.

In some embodiments, the server 102 is programmed to detect a correlation between the viewer state identified for the aggregate viewer item and the player state identified for the player item or the activity state identified for the activity item associated with the specific player account. The server is programmed to then generate an alert of the correlation as an additional effect.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
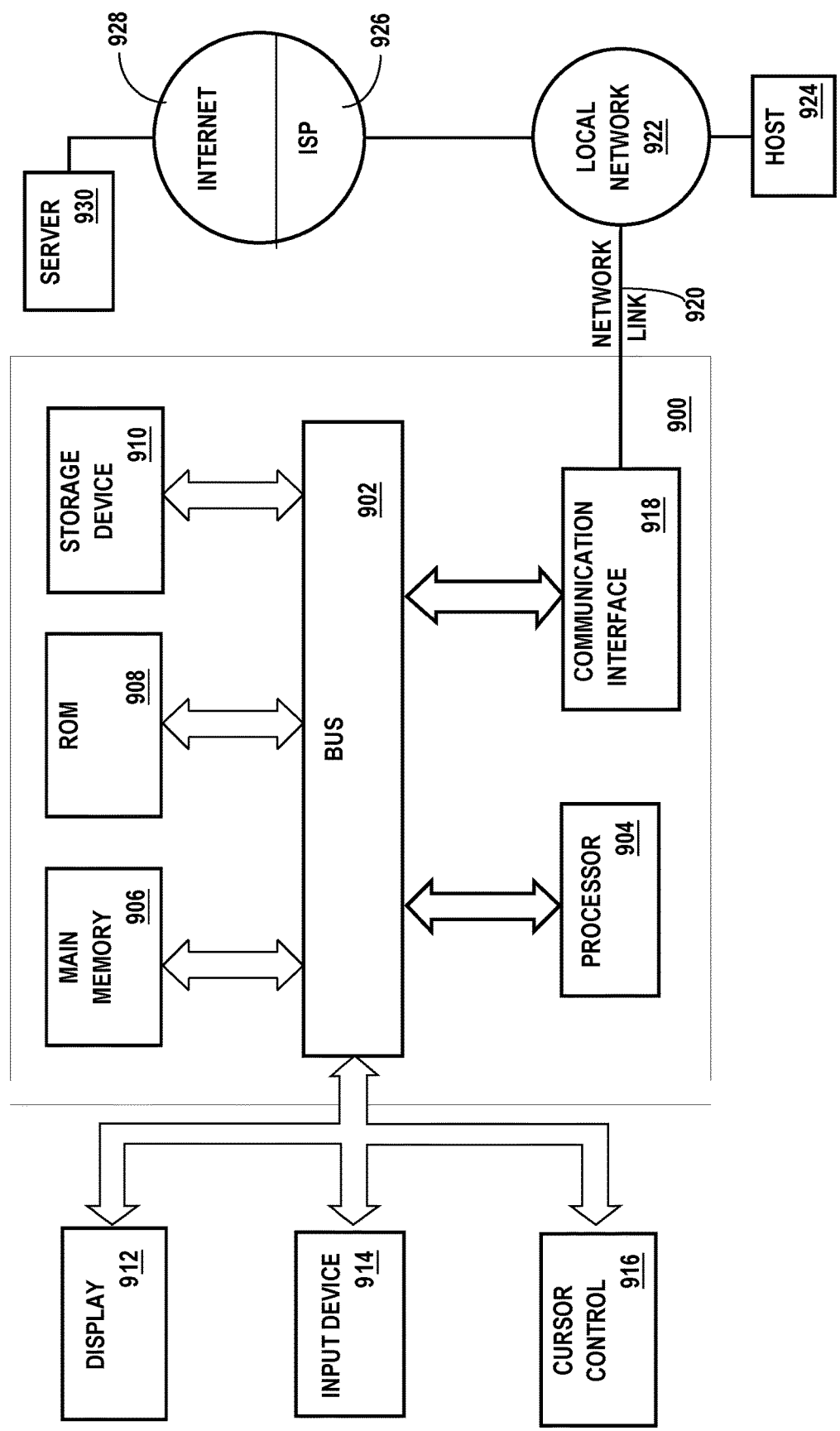
FIG. 9 is a block diagram that illustrates a computer system upon which an embodiment of the invention may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM, and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server 930 broadly represents any computer, data center, virtual machine or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or NoSQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A computer-implemented method of automatic multimedia production, comprising:
   defining, by a processor, a plurality of activity states related to participating in an online activity;
   defining a plurality of player states related to physical expressions and actions of a player participating in the online activity;
   receiving, by the processor, activity data including activity multimedia associated with each of one or more player accounts of players participating in the online activity, the activity multimedia representing live participation in the online activity over a certain period, the activity multimedia being received continuously as the online activity is being performed;
   receiving player data including player multimedia associated with each of the one or more player accounts, the player multimedia capturing live physical expressions and actions of a player of a player account during the player's participation in the online activity over the certain period, the physical expressions indicative of at least one of emotions, sentiments, or apparent mental states of the player, the player multimedia being received continuously as the online activity is being performed;

identifying, at or near each time point of a plurality of time points within the certain period, an activity state of the plurality of activity states for each activity item being a portion of the activity data associated with each player account of the one or more player accounts that is produced corresponding to the time point;

identifying, at or near each time point of a plurality of time points within the certain period, a player state of the plurality of player states for each player item being a portion of the player data associated with each player account of the one or more player accounts that has live coverage corresponding to the time point;

selecting, at or near each time point of the plurality of time points, a segment of an activity item or a segment of a player item from the one or more activity items or the one or more player items corresponding to the time point to form a foreground of a composite item based on the corresponding one or more activity states or the one or more player states;

determining, at or near each time point of the plurality of time points, a visual effect or an auditory effect from the segment of the activity item or the segment of the player item, the determining a visual effect or an auditory effect comprising:

detecting a discrepancy or disagreement between an expected reaction of a player to the player's participation in the online activity depicted in the segment of the activity item and an actual reaction of the player captured in the segment of the player item, or between a physical expression or action of a digital representation of the player in the online activity in the segment of the activity item and a physical expression and action of the player captured in the segment of the player item; and generating an alert of the discrepancy or disagreement; and applying the visual effect or auditory effect to the composite item as an addition to the segment of the activity item, a change to the segment of the player item, or a change to a background of the composite item; and transmitting, at or near each time point of the plurality of time points, a piece of multimedia based on the composite item to a viewer computer associated with a viewer of performance of the online activity.

2. The computer-implemented method of claim 1, the online activity being a computer game.

3. The computer-implemented method of claim 1, the plurality of activity states including an activity state that corresponds to a stage or an event of the online activity or an object or a location represented in the online activity.

4. The computer-implemented method of claim 1, the plurality of player states including a player state that corresponds to the physical expression.

5. The computer-implemented method of claim 1, the activity data including activity metadata for the online activity created by an activity provider computer and accessible through an application programming interface (API) provided by the activity provider computer.

6. The computer-implemented method of claim 1, the player data associated with a player account of a player including player metadata for the player that indicates demographic information, one or more playing habits related to the online activity, or one or more preferences related to the online activity.

7. The computer-implemented method of claim 6, the one or more preferences being associated with player presentation, composite multimedia generation, or viewer feedback, the selecting being further based on the one or more preferences.

8. The computer-implemented method of claim 6, the one or more preferences being associated with composite multimedia generation being related to use of input devices to generate corresponding player multimedia, visual or auditory theme or effects to use for the corresponding player multimedia, positioning of the corresponding player multimedia relative to corresponding activity multimedia in the composite multimedia, expressions, gestures, or speech captured in the corresponding player multimedia to be manifested or avoided, or objects, actions, or scenes depicted in the corresponding activity multimedia to be manifested on or deemphasized.

9. The computer-implemented method of claim 1,
  the player multimedia associated with a player account of a player including multiple feeds from multiple sensors located at or near a location of the player,
  the multiple sensors including a microphone, a camera, a keyboard, a thermometer, a heart rate monitor, or an eye-tracking device.

10. The computer-implemented method of claim 1, further comprising building a digital model for classifying a particular activity item corresponding to a particular time point into a particular activity state of the plurality of activity states using a machine learning technique, the identifying an activity state for each activity item comprising applying the digital model to the activity item.

11. The computer-implemented method of claim 1, further comprising building a digital model for classifying a particular player item corresponding to a particular time point into a particular player state of the plurality of player states using a machine learning technique, the identifying a player state for each player item comprising applying the digital model to the player item.

12. The computer-implemented method of claim 1, the determining an auditory effect comprising selecting audio data that corresponds to a video portion of the segment of the player item or that clarifies, complements or amplifies an audio portion of the segment of the player item.

13. The computer-implemented method of claim 1, the determining a visual effect comprising selecting video data that hides an identity of the player, indicates an absence of the player, matches a first value of a visual characteristic of a video portion of the segment of the player item with a second value of the visual characteristic of a video portion of the segment of the activity item, or clarifies the video portion of the segment of the player item or the video portion of the segment of the activity item.

14. The computer-implemented method of claim 1, the selecting comprising determining an arrangement of the segment of the activity item and the segment of the player item in the composite item based on the activity state of each of the one or more activity items.

15. The computer-implemented method of claim 14, the arrangement including a visual layout of the composite item in terms of the segment of the activity item and the segment of the player item, the plurality of activity states including a menu state, a gameplay state, and a map state,
  when the activity state identified for the activity item is the menu state, the arrangement assigning a first region that is smaller or further from a center of the composite item to the segment of the activity item and a second region that is larger or closer to the center of the composite item to the segment of the player item, when the activity state identified for the activity item is the gameplay state, the arrangement assigning a first region that is larger or closer to the center of the composite item to the segment of the activity item and a second region that is smaller or further from the center of the composite item to the segment of the player item, when the activity state identified for the activity item is the map state, the arrangement assigning a first region to the segment of the activity item including a map and a second region that does not overlap with an area within the first region assigned to the map to the segment of the player item.

16. The computer-implemented method of claim 14, the arrangement further including an audio mix of the composite item in terms of the segment of the activity item and the segment of the player item, the audio mix magnifying values of one or more audio characteristics of the segment of the activity item and the segment of the player item based on a visual layout of the composite item in terms of the segment of the activity item and the segment of the player item.

17. The computer-implemented method of claim 1, the selecting comprising assigning a player region of the composite item to the segment of the player item based on the player state of each of the one or more player items.

18. The computer-implemented method of claim 17, the selecting further comprising, after assigning the player region, assigning an activity region of the composite item to the segment of the activity item based on the activity state of each of the one or more activity items, a display of the activity region not obscuring a display of the player region.

19. A system comprising:
   one or more processors; and
   a non-transitory computer-readable medium storing instructions that, when executed by the one or more processors, cause the one or more processors to perform operations of the computer-implemented method of claim 1.

20. A non-transitory computer-readable medium storing instructions that, when executed by one or more processors, cause the one or more processors to perform operations of the computer-implemented method of claim 1.

* * * * *